(12) United States Patent
Wager et al.

(10) Patent No.: US 10,382,467 B2
(45) Date of Patent: *Aug. 13, 2019

(54) RECURSIVE MULTI-LAYER EXAMINATION FOR COMPUTER NETWORK SECURITY REMEDIATION

(71) Applicant: vArmour Networks, Inc., Mountain View, CA (US)

(72) Inventors: Ryan Wager, Kansas City, MO (US); Fyodor Yarochkin, Taipei (TW); Zach Dahlgren, Omaha, NE (US)

(73) Assignee: vArmour Networks, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,181

(22) Filed: Apr. 21, 2017

(65) Prior Publication Data

US 2017/0223038 A1    Aug. 3, 2017

Related U.S. Application Data

(63) Continuation of application No. 15/090,523, filed on Apr. 4, 2016, now Pat. No. 9,680,852.

(Continued)

(51) Int. Cl.
*G06F 11/00* (2006.01)
*G06F 12/14* (2006.01)
(Continued)

(52) U.S. Cl.
CPC ...... *H04L 63/1425* (2013.01); *H04L 63/0227* (2013.01); *H04L 63/08* (2013.01);
(Continued)

(58) Field of Classification Search
CPC . H04L 63/14; H04L 63/1408; H04L 63/1416; H04L 63/1425; H04L 63/1433;
(Continued)

(56) References Cited

U.S. PATENT DOCUMENTS 6,253,321 B1    6/2001 Nikander et al.
6,484,261 B1   11/2002 Wiegel
(Continued)

FOREIGN PATENT DOCUMENTS

TW    201642616 A    12/2016
TW    201642617 A    12/2016
(Continued)

OTHER PUBLICATIONS

Non-Final Office Action, dated Aug. 12, 2014, U.S. Appl. No. 13/861,220, filed Apr. 11, 2013.
(Continued)

*Primary Examiner* — Trong H Nguyen
(74) *Attorney, Agent, or Firm* — Carr & Ferrell LLP

(57) ABSTRACT

Computer-implemented methods and apparatuses for recursive multi-layer examination for computer network security remediation may include: identifying one or more first communications originating from or directed to a first node; identifying at least one of a protocol and an application used for each of the one or more first communications; examining each of the one or more first communications for malicious behavior; receiving a first risk score for each of the one or more first communications responsive to the examining; determining the first risk score associated with one of the one or more first communications exceeds a first predetermined threshold; and indicating the first node and a second node in communication with the first node via the one of the one or more first communications are malicious. Exemplary methods may further include: providing the identified malicious nodes and communications originating from or directed to the malicious nodes.

18 Claims, 11 Drawing Sheets

Related U.S. Application Data

(60) Provisional application No. 62/289,053, filed on Jan. 29, 2016.

(51) Int. Cl.
  *G06F 12/16* (2006.01)
  *G08B 23/00* (2006.01)
  *H04L 29/06* (2006.01)

(52) U.S. Cl.
  CPC .......... *H04L 63/10* (2013.01); *H04L 63/1416* (2013.01); *H04L 63/1441* (2013.01); *H04L 63/0263* (2013.01)

(58) Field of Classification Search
  CPC ............... H04L 63/1441; H04L 63/145; H04L 29/06877; H04L 29/06884; H04L 29/06891; H04L 29/06897; H04L 29/06904; H04L 29/06911; H04L 29/06918
  USPC .................................................... 726/22–25
  See application file for complete search history.

(56) References Cited

U.S. PATENT DOCUMENTS

| | | |
|---|---|---|
| 6,578,076 B1 | 6/2003 | Putzolu |
| 6,765,864 B1 | 7/2004 | Natarajan et al. |
| 6,970,459 B1 | 11/2005 | Meier |
| 7,058,712 B1 | 6/2006 | Vasko et al. |
| 7,062,566 B2 | 6/2006 | Amara et al. |
| 7,096,260 B1 | 8/2006 | Zavalkovsky et al. |
| 7,373,524 B2 | 5/2008 | Motsinger et al. |
| 7,397,794 B1 | 7/2008 | Lacroute et al. |
| 7,516,476 B1 | 4/2009 | Kraemer et al. |
| 7,519,062 B1 | 4/2009 | Kloth et al. |
| 7,694,181 B2 | 4/2010 | Noller et al. |
| 7,742,414 B1 | 6/2010 | Iannaccone et al. |
| 7,774,837 B2 | 8/2010 | McAlister |
| 7,849,495 B1 | 12/2010 | Huang et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,112,304 B2 | 2/2012 | Scates |
| 8,254,381 B2 | 8/2012 | Allen et al. |
| 8,259,571 B1 | 9/2012 | Raphel et al. |
| 8,291,495 B1* | 10/2012 | Burns ................. H04L 63/0254 726/23 |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,429,647 B2 | 4/2013 | Zhou |
| 8,468,113 B2 | 6/2013 | Harrison et al. |
| 8,490,153 B2 | 7/2013 | Bassett et al. |
| 8,494,000 B1 | 7/2013 | Nadkarni et al. |
| 8,499,330 B1 | 7/2013 | Albisu et al. |
| 8,528,091 B2 | 9/2013 | Bowen et al. |
| 8,565,118 B2 | 10/2013 | Shukla et al. |
| 8,612,744 B2 | 12/2013 | Shieh |
| 8,661,434 B1 | 2/2014 | Liang et al. |
| 8,677,496 B2 | 3/2014 | Wool |
| 8,688,491 B1 | 4/2014 | Shenoy et al. |
| 8,726,343 B1 | 5/2014 | Borzycki et al. |
| 8,798,055 B1 | 8/2014 | An |
| 8,813,169 B2 | 8/2014 | Shieh |
| 8,813,236 B1* | 8/2014 | Saha ................... H04L 63/1408 726/22 |
| 8,819,762 B2 | 8/2014 | Harrison et al. |
| 8,898,788 B1 | 11/2014 | Aziz et al. |
| 8,935,457 B2 | 1/2015 | Feng et al. |
| 8,938,782 B2 | 1/2015 | Sawhney et al. |
| 8,990,371 B2 | 3/2015 | Kalyanaraman et al. |
| 9,009,829 B2 | 4/2015 | Stolfo et al. |
| 9,015,299 B1 | 4/2015 | Shah |
| 9,027,077 B1 | 5/2015 | Bharali et al. |
| 9,060,025 B2 | 6/2015 | Xu |
| 9,141,625 B1 | 9/2015 | Thornewell et al. |
| 9,191,327 B2 | 11/2015 | Shieh et al. |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,407,602 B2 | 8/2016 | Feghali et al. |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 9,762,599 B2 | 9/2017 | Wager et al. |
| 9,973,472 B2 | 5/2018 | Woolward et al. |
| 10,009,317 B2 | 6/2018 | Woolward |
| 10,009,381 B2 | 6/2018 | Lian et al. |
| 10,264,025 B2 | 4/2019 | Woolward |
| 2002/0031103 A1 | 3/2002 | Wiedeman et al. |
| 2002/0066034 A1 | 5/2002 | Schlossberg et al. |
| 2003/0055950 A1 | 3/2003 | Cranor et al. |
| 2003/0177389 A1 | 9/2003 | Albert et al. |
| 2004/0062204 A1 | 4/2004 | Bearden et al. |
| 2004/0095897 A1 | 5/2004 | Vafaei |
| 2005/0021943 A1 | 1/2005 | Ikudome et al. |
| 2005/0033989 A1* | 2/2005 | Poletto ................ H04L 63/1416 726/4 |
| 2005/0114829 A1 | 5/2005 | Robin et al. |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0005228 A1 | 1/2006 | Matsuda |
| 2006/0037077 A1 | 2/2006 | Gadde et al. |
| 2006/0050696 A1 | 3/2006 | Shah et al. |
| 2007/0016945 A1 | 1/2007 | Bassett et al. |
| 2007/0019621 A1 | 1/2007 | Perry et al. |
| 2007/0022090 A1 | 1/2007 | Graham |
| 2007/0064617 A1* | 3/2007 | Reves ................. H04L 63/1425 370/252 |
| 2007/0079308 A1 | 4/2007 | Chiaramonte et al. |
| 2007/0130566 A1 | 6/2007 | van Rietschote et al. |
| 2007/0168971 A1 | 7/2007 | Royzen et al. |
| 2007/0192861 A1 | 8/2007 | Varghese et al. |
| 2007/0192863 A1 | 8/2007 | Kapoor et al. |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016550 A1 | 1/2008 | McAlister |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0229382 A1 | 9/2008 | Vitalos |
| 2008/0239961 A1 | 10/2008 | Hilerio et al. |
| 2008/0301770 A1 | 12/2008 | Kinder |
| 2008/0307110 A1 | 12/2008 | Wainner et al. |
| 2009/0077621 A1 | 3/2009 | Lang et al. |
| 2009/0083445 A1 | 3/2009 | Ganga |
| 2009/0138316 A1 | 5/2009 | Weller et al. |
| 2009/0165078 A1 | 6/2009 | Samudrala et al. |
| 2009/0190585 A1 | 7/2009 | Allen et al. |
| 2009/0249470 A1 | 10/2009 | Litvin et al. |
| 2009/0260051 A1 | 10/2009 | Igakura |
| 2009/0268667 A1 | 10/2009 | Gandham et al. |
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Bimbach |
| 2010/0095367 A1 | 4/2010 | Narayanaswamy |
| 2010/0191863 A1 | 7/2010 | Wing |
| 2010/0192223 A1 | 7/2010 | Ismael et al. |
| 2010/0192225 A1 | 7/2010 | Ma et al. |
| 2010/0199349 A1* | 8/2010 | Ellis .................... G06F 21/552 726/24 |

(56) References Cited

U.S. PATENT DOCUMENTS

| | | |
|---|---|---|
| 2010/0208699 A1 | 8/2010 | Lee et al. |
| 2010/0228962 A1 | 9/2010 | Simon et al. |
| 2010/0235880 A1 | 9/2010 | Chen et al. |
| 2010/0274970 A1 | 10/2010 | Treuhaft et al. |
| 2010/0281539 A1* | 11/2010 | Burns ................ H04L 63/1441 726/23 |
| 2010/0333165 A1 | 12/2010 | Basak et al. |
| 2011/0003580 A1 | 1/2011 | Belrose et al. |
| 2011/0069710 A1 | 3/2011 | Naven et al. |
| 2011/0072486 A1 | 3/2011 | Hadar et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1 | 8/2012 | Rolette et al. |
| 2012/0311144 A1 | 12/2012 | Akelbein et al. |
| 2012/0311575 A1 | 12/2012 | Song |
| 2012/0324567 A1 | 12/2012 | Couto et al. |
| 2013/0019277 A1 | 1/2013 | Chang et al. |
| 2013/0081142 A1* | 3/2013 | McDougal ............ G06F 21/554 726/24 |
| 2013/0086399 A1 | 4/2013 | Tychon et al. |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0166490 A1 | 6/2013 | Elkins et al. |
| 2013/0166720 A1 | 6/2013 | Takashima et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298184 A1 | 11/2013 | Ermagan et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1 | 10/2014 | Stuntebeck et al. |
| 2014/0344435 A1 | 11/2014 | Mortimore, Jr. et al. |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0229641 A1 | 8/2015 | Sun et al. |
| 2015/0249676 A1* | 9/2015 | Koyanagi ............ H04L 63/1425 726/22 |
| 2015/0269383 A1 | 9/2015 | Lang et al. |
| 2015/0295943 A1 | 10/2015 | Malachi |
| 2016/0028851 A1 | 1/2016 | Shieh |
| 2016/0191545 A1 | 6/2016 | Nanda et al. |
| 2016/0203331 A1 | 7/2016 | Khan et al. |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0323245 A1 | 11/2016 | Shieh et al. |
| 2017/0063795 A1 | 3/2017 | Lian et al. |
| 2017/0134422 A1 | 5/2017 | Shieh et al. |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0279770 A1 | 9/2017 | Woolward et al. |
| 2017/0339188 A1 | 11/2017 | Jain et al. |
| 2017/0374032 A1 | 12/2017 | Woolward et al. |
| 2017/0374101 A1 | 12/2017 | Woolward |
| 2018/0005296 A1 | 1/2018 | Eades et al. |
| 2018/0191779 A1 | 7/2018 | Shieh et al. |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 A1 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

Non-Final Office Action, dated Nov. 19, 2014, U.S. Appl. No. 13/363,082, filed Jan. 31, 2012.

Non-Final Office Action, dated Jan. 23, 2015, U.S. Appl. No. 13/847,881, filed Mar. 20, 2013.

Final Office Action, dated Jan. 23, 2015, U.S. Appl. No. 13/861,220, filed Apr. 11, 2013.

Final Office Action, dated Apr. 30, 2015, U.S. Appl. No. 13/363,082, filed Jan. 31, 2012.

Non-Final Office Action, dated May 1, 2015, U.S. Appl. No. 13/860,404, filed Apr. 10, 2014.

Final Office Action, dated May 13, 2015, U.S. Appl. No. 13/847,881, filed Mar. 20, 2013.

Non-Final Office Action, dated May 18, 2015, U.S. Appl. No. 13/861,220, filed Apr. 11, 2013.

Non-Final Office Action, dated Jul. 1, 2015, U.S. Appl. No. 14/673,640, filed Mar. 30, 2015.

Non-Final Office Action, dated Jul. 7, 2015, U.S. Appl. No. 14/673,679, filed Mar. 30, 2015.

Non-Final Office Action, dated Jul. 16, 2015, U.S. Appl. No. 14/677,827, filed Apr. 2, 2015.

Notice of Allowance, dated Aug. 12, 2015, U.S. Appl. No. 13/363,082, filed Jan. 31, 2012.

Notice of Allowance, dated Nov. 9, 2015, U.S. Appl. No. 13/847,881, filed Mar. 20, 2013.

Final Office Action, dated Dec. 2, 2015, U.S. Appl. No. 14/677,827, filed Apr. 2, 2015.

Final Office Action, dated Dec. 3, 2015, U.S. Appl. No. 13/860,404, filed Apr. 10, 2014.

Final Office Action, dated Dec. 4, 2015, U.S. Appl. No. 14/673,640, filed Mar. 30, 2015.

Non-Final Office Action, dated Jan. 28, 2016, U.S. Appl. No. 14/877,836, filed Oct. 7, 2015.

Notice of Allowance, dated Feb. 16, 2016, U.S. Appl. No. 14/673,640, filed Mar. 30, 2015.

Non-Final Office Action, dated May 18, 2016, U.S. Appl. No. 14/964,318, filed Dec. 9, 2015.

Non-Final Office Action, dated Jul. 6, 2016, U.S. Appl. No. 15/151,303, filed May 10, 2016.

Final Office Action, dated Jul. 7, 2016, U.S. Appl. No. 14/877,836, filed Oct. 7, 2015.

Non-Final Office Action, dated Jul. 14, 2016, U.S. Appl. No. 13/860,404, filed Apr. 10, 2013.

Non-Final Office Action, dated Jul. 25, 2016, U.S. Appl. No. 15/090,523, filed Apr. 4, 2016.

(56) References Cited

OTHER PUBLICATIONS

Notice of Allowance, dated Jul. 27, 2016, U.S. Appl. No. 15/080,519, filed Mar. 24, 2016.
Non-Final Office Action, dated Aug. 2, 2016, U.S. Appl. No. 14/657,210, filed Mar. 13, 2015.
Non-Final Office Action, dated Sep. 16, 2016, U.S. Appl. No. 15/209,275, filed Jul. 13, 2016.
Non-Final Office Action, dated Oct. 13, 2016, U.S. Appl. No. 15/199,605, filed Jun. 30, 2016.
Final Office Action, dated Nov. 14, 2016, U.S. Appl. No. 14/964,318, filed Dec. 9, 2015.
Notice of Allowance, dated Nov. 17, 2016, U.S. Appl. No. 14/877,836, filed Oct. 7, 2015.
Notice of Allowance, dated Nov. 29, 2016, U.S. Appl. No. 15/151,303, filed May 10, 2016.
Final Office Action, dated Jan. 4, 2017, U.S. Appl. No. 14/657,210, filed Mar. 13, 2015.
Non-Final Office Action, dated Jan. 5, 2017, U.S. Appl. No. 15/348,978, filed Nov. 10, 2016.
Final Office Action, dated Jan. 18, 2017, U.S. Appl. No. 13/860,404, filed Apr. 10, 2013.
Notice of Allowance, dated Feb. 1, 2017, U.S. Appl. No. 15/090,523, filed Apr. 4, 2016.
Final Office Action, dated Apr. 19, 2017, U.S. Appl. No. 15/209,275, filed Jul. 13, 2016.
Notice of Allowance, dated Apr. 21, 2017, U.S. Appl. No. 15/348,978, filed Nov. 10, 2016.
Final Office Action, dated May 3, 2017, U.S. Appl. No. 15/199,605, filed Jun. 30, 2016.
Non-Final Office Action, dated May 15, 2017, U.S. Appl. No. 14/657,210, filed Mar. 13, 2015.
Non-Final Office Action, dated May 22, 2017, U.S. Appl. No. 15/008,298, filed Jan. 27, 2016.
Non-Final Office Action, dated Jun. 19, 2017, U.S. Appl. No. 15/479,728, filed Apr. 5, 2017.
Non-Final Office Action, dated Jul. 7, 2017, U.S. Appl. No. 14/964,318, filed Dec. 9, 2015.
"International Search Report" and "Written Opinion of the International Searching Authority," Patent Cooperation Treaty Application No. PCT/US2016/024116, dated May 3, 2016, 12 pages.
"International Search Report" and "Written Opinion of the International Searching Authority," Patent Cooperation Treaty Application No. PCT/US2016/024300, dated May 3, 2016, 9 pages.
"International Search Report" and "Written Opinion of the International Searching Authority," Patent Cooperation Treaty Application No. PCT/US2016/024053, dated May 3, 2016, 12 pages.
"International Search Report" and "Written Opinion of the International Searching Authority," Patent Cooperation Treaty Application No. PCT/US2016/019643, dated May 6, 2016, 27 pages.
Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection, 3 pages.
"International Search Report" and "Written Opinion of the International Searching Authority," Patent Cooperation Treaty Application No. PCT/US2016/024310, dated Jun. 20, 2016, 9 pages.
"Feature Handbook: NetBrain® Enterprise Edition 6.1" NetBrain Technologies, Inc., Feb. 25, 2016, 48 pages.
Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.
"International Search Report" and "Written Opinion of the International Searching Authority," Patent Cooperation Treaty Application No. PCT/US2016/065451, dated Jan. 12, 2017, 20 pages.
Maniar, Neeta, "Centralized Tracking and Risk Analysis of 3rd Party Firewall Connections," SANS Institute InfoSec Reading Room, Mar. 11, 2005, 20 pages.
Hu, Hongxin et al., "Detecting and Resolving Firewall Policy Anomalies," IEEE Transactions on Dependable and Secure Computing, vol. 9, No. 3, May/Jun. 2012, pp. 318-331.

\* cited by examiner ical) envi-
RECURSIVE MULTI-LAYER EXAMINATION FOR COMPUTER NETWORK SECURITY REMEDIATION

CROSS-REFERENCE TO RELATED APPLICATIONS

This application is a continuation of U.S. patent application Ser. No. 15/090,523, filed Apr. 4, 2016, which in turn claims the benefit of U.S. Provisional Application No. 62/289,053 filed Jan. 29, 2016, which are hereby incorporated by reference herein in their entirety, including all references and appendices cited therein, for all purposes.

FIELD OF THE INVENTION

The present technology pertains to computer security, and more specifically to computer network security.

BACKGROUND ART

A hardware firewall is a network security system that controls incoming and outgoing network traffic. A hardware firewall generally creates a barrier between an internal network (assumed to be trusted and secure) and another network (e.g., the Internet) that is assumed not to be trusted and secure.

Attackers breach internal networks to steal critical data. For example, attackers target low-profile assets to enter the internal network. Inside the internal network and behind the hardware firewall, attackers move laterally across the internal network, exploiting East-West traffic flows, to critical enterprise assets. Once there, attackers siphon off valuable company and customer data.

SUMMARY OF THE INVENTION

Some embodiments of the present invention include computer-implemented methods and apparatuses for recursive multi-layer examination for computer network security remediation is provided herein. Exemplary methods may include: receiving a first identifier associated with a first node; retrieving first metadata using the first identifier; identifying a second node in communication with the first node using the first metadata; ascertaining a first characteristic of each first communication between the first and second nodes using the first metadata; examining each first communication for malicious behavior using the first characteristic; receiving a first risk score for each first communication responsive to the examining; and determining the first risk score associated with one of the second communications exceeds a first predetermined threshold and indicating the first and second nodes are malicious.

Exemplary methods may further include: retrieving second metadata using a second identifier associated with the second node; identifying a third node in communication with the second node using the second metadata; ascertaining a second characteristic of each second communication between the second and third nodes using the second metadata; examining each second communication for malicious behavior using the second characteristic; receiving a second risk score for each second communication responsive to the examining; determining the second risk score associated with one of the second communications exceeds the first predetermined threshold and indicating the third node is malicious; providing the identified malicious nodes and communications originating from or directed to the malicious nodes, such that the progress of a security breach or intrusion through the identified malicious nodes and communications is indicated; and remediating the security breach.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
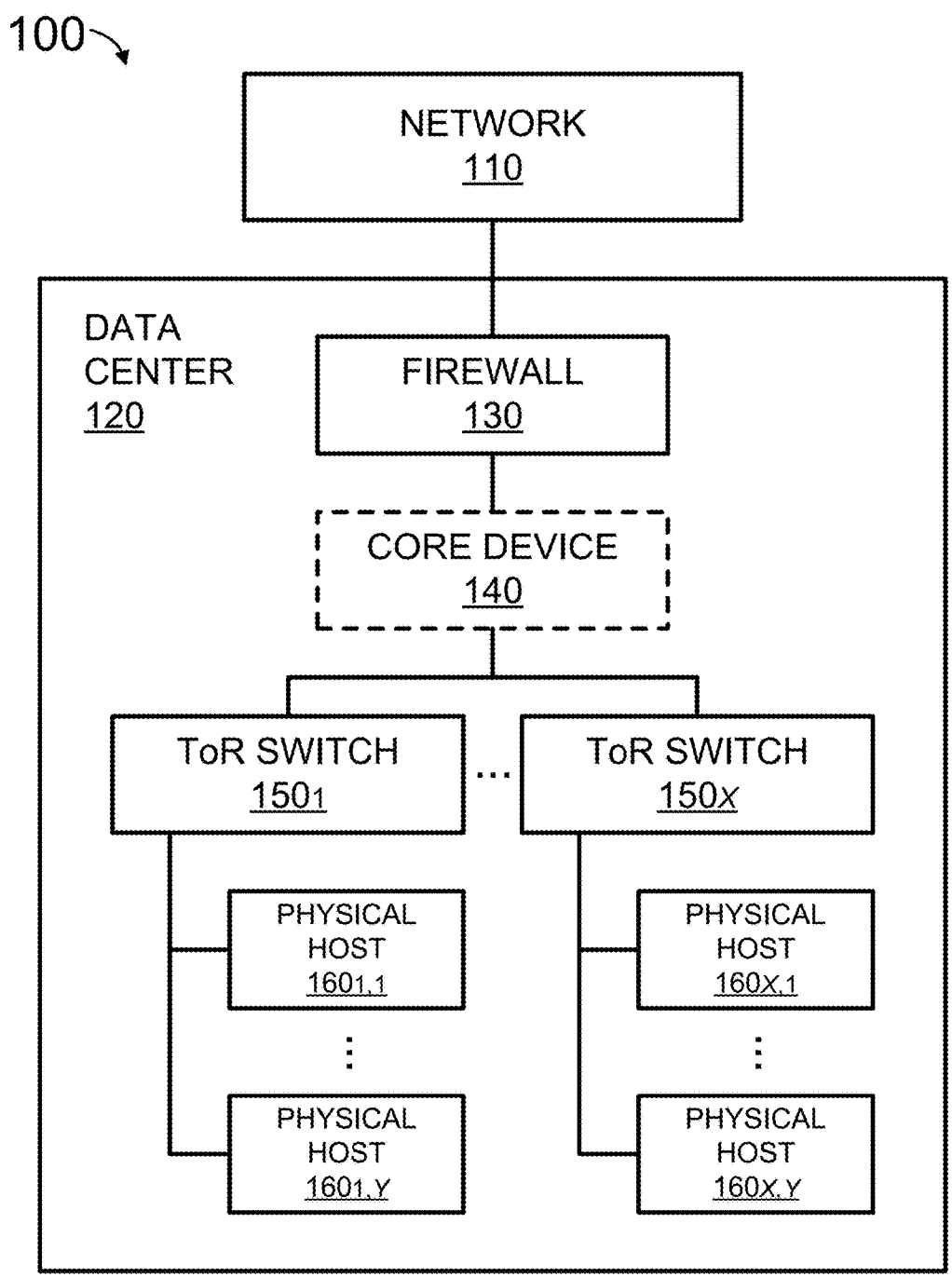
FIG. 1 is a simplified block diagram of an (physical) environment, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Information technology (IT) organizations face cyber threats and advanced attacks. Firewalls are an important part of network security. Firewalls control incoming and outgoing network traffic using a rule set. A rule, for example, allows a connection to a specific (Internet Protocol (IP)) address (and/or port), allows a connection to a specific (IP) address (and/or port) if the connection is secured (e.g., using Internet Protocol security (IPsec)), blocks a connection to a specific (IP) address (and/or port), redirects a connection from one IP address (and/or port) to another IP address (and/or port), logs communications to and/or from a specific IP address (and/or port), and the like. A firewall rule at a low level of abstraction may indicate a specific (IP) address and protocol to which connections are allowed and/or not allowed.

Managing a set of firewall rules is a difficult challenge. Some IT security organizations have a large staff (e.g., dozens of staff members) dedicated to maintaining firewall policy (e.g., a firewall rule set). A firewall rule set can have tens of thousands or even hundreds of thousands of rules. Some embodiments of the present technology may autonomically generate a reliable declarative security policy at a high level of abstraction. Abstraction is a technique for managing complexity by establishing a level of complexity which suppresses the more complex details below the current level. The high-level declarative policy may be compiled to produce a firewall rule set at a low level of abstraction.

FIG. 1 illustrates a system 100 according to some embodiments. System 100 includes network 110 and data center 120. In various embodiments, data center 120 includes firewall 130, optional core switch/router (also referred to as a core device) 140, Top of Rack (ToR) switches $150_1$-$150_x$, and physical hosts $160_{1,1}$-$160_{x,y}$.

Network 110 (also referred to as a computer network or data network) is a telecommunications network that allows computers to exchange data. For example, in network 110, networked computing devices pass data to each other along data connections (e.g., network links). Data can be transferred in the form of packets. The connections between nodes may be established using either cable media or wireless media. For example, network 110 includes at least one of a local area network (LAN), wireless local area network (WLAN), wide area network (WAN), metropolitan area network (MAN), and the like. In some embodiments, network 110 includes the Internet.

Data center 120 is a facility used to house computer systems and associated components. Data center 120, for example, comprises computing resources for cloud computing services or operated for the benefit of a particular organization. Data center equipment, for example, is generally mounted in rack cabinets, which are usually placed in single rows forming corridors (e.g., aisles) between them. Firewall 130 creates a barrier between data center 120 and network 110 by controlling incoming and outgoing network traffic based on a rule set.

Optional core switch/router 140 is a high-capacity switch/router that serves as a gateway to network 110 and provides communications between ToR switches $150_1$ and $150_x$, and between ToR switches $150_1$ and $150_x$ and network 110. ToR switches $150_1$ and $150_x$ connect physical hosts $160_{1,1}$-$160_{1,y}$ and $160_{x,1}$-$160_{x,y}$ (respectively) together and to network 110 (optionally through core switch/router 140). For example, ToR switches $150_1$-$150_x$ use a form of packet switching to forward data to a destination physical host (of physical hosts $160_{1,1}$-$160_{x,y}$) and (only) transmit a received message to the physical host for which the message was intended.

In some embodiments, physical hosts $160_{1,1}$-$160_{x,y}$ are computing devices that act as computing servers such as blade servers. Computing devices are described further in relation to FIG. 7. For example, physical hosts $160_{1,1}$-$160_{x,y}$ comprise physical servers performing the operations described herein, which can be referred to as a bare-metal server environment. Additionally or alternatively, physical hosts $160_{1,1}$-$160_{x,y}$ may be a part of a cloud computing environment. Cloud computing environments are described further in relation to FIG. 7. By way of further non-limiting example, physical hosts $160_{1,1}$-$160_{x,y}$ can host different combinations and permutations of virtual and container environments (which can be referred to as a virtualization environment), which are described further below in relation to FIGS. 2-4.

Figure 2:
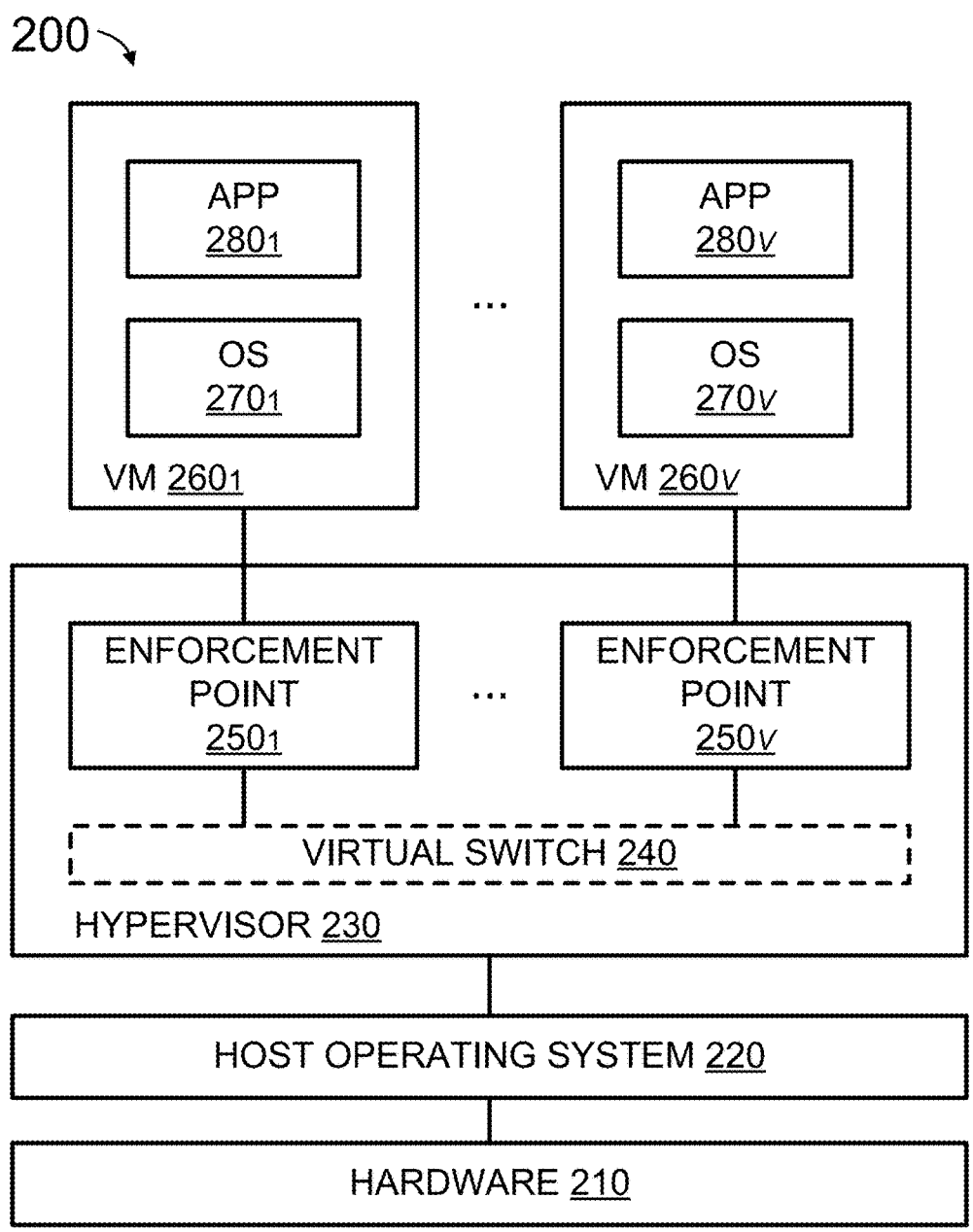
FIG. 2 is simplified block diagram of an (virtual) environment, in accordance with some embodiments.

FIG. 2 depicts (virtual) environment 200 according to various embodiments. In some embodiments, environment 200 is implemented in at least one of physical hosts $160_{1,1}$-$160_{x,y}$ (FIG. 1). Environment 200 includes hardware 210, host operating system (OS) 220, hypervisor 230, and virtual machines (VMs) $260_1$-$260_V$. In some embodiments, hardware 210 is implemented in at least one of physical hosts $160_{1,1}$-$160_{x,y}$ (FIG. 1). Host operating system 220 can run on hardware 210 and can also be referred to as the host kernel. Hypervisor 230 optionally includes virtual switch 240 and includes enforcement points $250_1$-$250_V$. VMs $260_1$-$260_V$ each include a respective one of operating systems (OSes) $270_1$-$270_V$ and applications (APPs) $280_1$-$280_V$.

Hypervisor (also known as a virtual machine monitor (VMM)) 230 is software running on at least one of physical hosts $160_{1,1}$-$160_{x,y}$, and hypervisor 230 runs VMs $260_1$-$260_V$. A physical host (of physical hosts $160_{1,1}$-$160_{x,y}$) on which hypervisor 230 is running one or more virtual machines $260_1$-$260_V$, is also referred to as a host machine. Each VM can also be referred to as a guest machine.

For example, hypervisor 230 allows multiple OSes $270_1$-$270_V$ to share a single physical host (of physical hosts $160_{1,1}$-$160_{x,y}$). Each of OSes $270_1$-$270_V$ appears to have the host machine's processor, memory, and other resources all to itself. However, hypervisor 230 actually controls the host machine's processor and resources, allocating what is needed to each operating system in turn and making sure that the guest OSes (e.g., virtual machines $260_1$-$260_V$) cannot disrupt each other. OSes $270_1$-$270_V$ are described further in relation to FIG. 7.

VMs $260_1$-$260_V$ also include applications $280_1$-$280_V$. Applications (and/or services) $280_1$-$280_V$ are programs designed to carry out operations for a specific purpose. Applications $280_1$-$280_V$ can include at least one of web application (also known as web apps), web server, transaction processing, database, and the like software. Applications $280_1$-$280_V$ run using a respective OS of OSes $270_1$-$270_V$.

Hypervisor 230 optionally includes virtual switch 240. Virtual switch 240 is a logical switching fabric for networking VMs $260_1$-$260_V$. For example, virtual switch 240 is a program running on a physical host (of physical hosts $160_{1,1}$-$160_{x,y}$) that allows a VM (of VMs $260_1$-$260_V$) to communicate with another VM.

Hypervisor 230 also includes enforcement points $250_1$-$250_V$, according to some embodiments. For example, enforcement points $250_1$-$250_V$ are a firewall service that provides network traffic filtering and monitoring for VMs $260_1$-$260_V$ and containers (described below in relation to FIGS. 3 and 4). Enforcement points $250_1$-$250_V$ are described further in related United States Patent Application "Methods and Systems for Orchestrating Physical and Virtual Switches to Enforce Security Boundaries" (application Ser. No. 14/677,827) filed Apr. 2, 2015, which is hereby incorporated by reference for all purposes. Although enforcement points $250_1$-$250_V$ are shown in hypervisor 230, enforcement points $250_1$-$250_V$ can additionally or alternatively be realized in one or more containers (described below in relation to FIGS. 3 and 4).

According to some embodiments, enforcement points $250_1$-$250_V$ control network traffic to and from a VM (of VMs $260_1$-$260_V$) (and/or a container) using a rule set. A rule, for example, allows a connection to a specific (IP) address, allows a connection to a specific (IP) address if the connection is secured (e.g., using IPsec), denies a connection to a specific (IP) address, redirects a connection from one IP address to another IP address (e.g., to a honeypot or tar pit), logs communications to and/or from a specific IP address, and the like. Each address is virtual, physical, or both. Connections are incoming to the respective VM (or a container), outgoing from the respective VM (or container), or both. Redirection is described further in related United States Patent Application "System and Method for Threat-Driven Security Policy Controls" (application Ser. No. 14/673,679) filed Mar. 30, 2015, which is hereby incorporated by reference for all purposes.

In some embodiments logging includes metadata associated with action taken by an enforcement point (of enforcement points $250_1$-$250_V$), such as the permit, deny, and log behaviors. For example, for a Domain Name System (DNS) request, metadata associated with the DNS request, and the action taken (e.g., permit/forward, deny/block, redirect, and log behaviors) are logged. Activities associated with other (application-layer) protocols (e.g., Dynamic Host Configuration Protocol (DHCP), Domain Name System (DNS), File Transfer Protocol (FTP), Hypertext Transfer Protocol (HTTP), Internet Message Access Protocol (IMAP), Post Office Protocol (POP), Secure Shell (SSH), Secure Sockets Layer (SSL), Transport Layer Security (TLS), telnet, Remote Desktop Protocol (RDP), Server Message Block (SMB), and the like) and their respective metadata may be additionally or alternatively logged. For example, metadata further includes at least one of a source (IP) address and/or hostname, a source port, destination (IP) address and/or hostname, a destination port, protocol, application, and the like.

Figure 3:
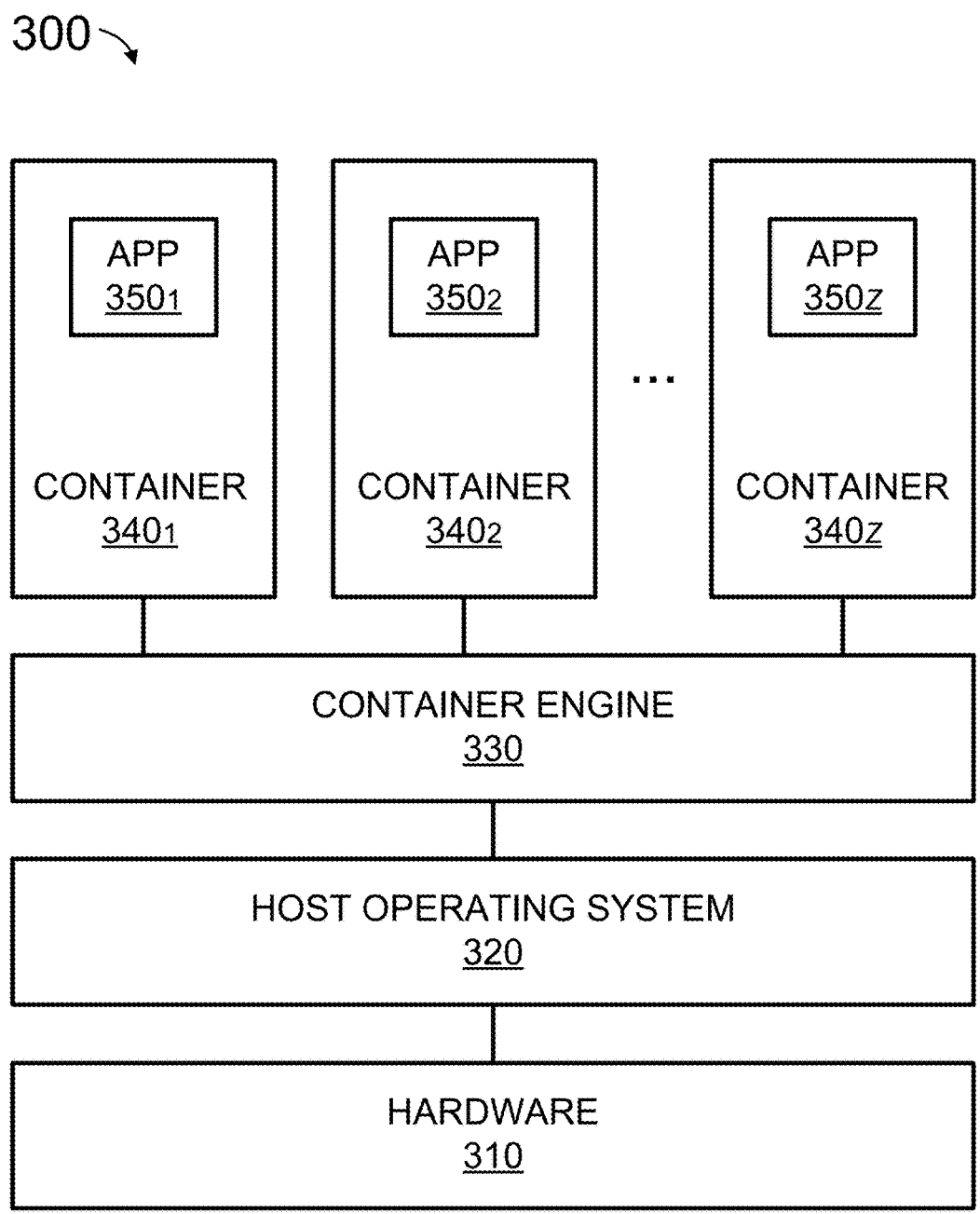
FIG. 3 is simplified block diagram of an environment, according to various embodiments.

FIG. 3 depicts environment 300 according to various embodiments. Environment 300 includes hardware 310, host operating system 320, container engine 330, and containers $340_1$-$340_2$. In some embodiments, hardware 310 is implemented in at least one of physical hosts $160_{1,1}$-$160_{x,y}$ (FIG. 1). Host operating system 320 runs on hardware 310 and can also be referred to as the host kernel. By way of non-limiting example, host operating system 320 can be at least one of: Linux, Red Hat® Enterprise Linux® Atomic Enterprise Platform, CoreOS®, Ubuntu® Snappy, Pivotal Cloud Foundry®, Oracle® Solaris, and the like. Host operating system 320 allows for multiple (instead of just one) isolated user-space instances (e.g., containers $340_1$-$340_2$) to run in host operating system 320 (e.g., a single operating system instance).

Host operating system 320 can include a container engine 330. Container engine 330 can create and manage containers $340_1$-$340_2$, for example, using an (high-level) application programming interface (API). By way of non-limiting example, container engine 330 is at least one of Docker®, Rocket (rkt), Solaris Containers, and the like. For example, container engine 330 may create a container (e.g., one of containers $340_1$-$340_z$) using an image. An image can be a (read-only) template comprising multiple layers and can be built from a base image (e.g., for host operating system 320) using instructions (e.g., run a command, add a file or directory, create an environment variable, indicate what process (e.g., application or service) to run, etc.). Each image may be identified or referred to by an image type. In some embodiments, images (e.g., different image types) are stored and delivered by a system (e.g., server side application) referred to as a registry or hub (not shown in FIG. 3).

Container engine 330 can allocate a filesystem of host operating system 320 to the container and add a read-write layer to the image. Container engine 330 can create a network interface that allows the container to communicate with hardware 310 (e.g., talk to a local host). Container engine 330 can set up an Internet Protocol (IP) address for the container (e.g., find and attach an available IP address from a pool). Container engine 330 can launch a process (e.g., application or service) specified by the image (e.g., run an application, such as one of APP $350_1$-$350_z$, described further below). Container engine 330 can capture and provide application output for the container (e.g., connect and log standard input, outputs and errors). The above examples are only for illustrative purposes and are not intended to be limiting.

Containers $340_1$-$340_z$ can be created by container engine 330. In some embodiments, containers $340_1$-$340_z$, are each an environment as close as possible to an installation of host operating system 320, but without the need for a separate kernel. For example, containers $340_1$-$340_z$ share the same operating system kernel with each other and with host operating system 320. Each container of containers $340_1$-$340_z$ can run as an isolated process in user space on host operating system 320. Shared parts of host operating system 320 can be read only, while each container of containers $340_1$-$340_z$ can have its own mount for writing.

Containers $340_1$-$340_z$ can include one or more applications (APP) $350_1$-$350_z$ (and all of their respective dependencies). APP $350_1$-$350_z$ can be any application or service. By way of non-limiting example, APP $350_1$-$350_z$ can be a database (e.g., Microsoft® SQL Server®, MongoDB, HTFS, etc.), email server (e.g., Sendmail®, Postfix, qmail, Microsoft® Exchange Server, etc.), message queue (e.g., Apache® Qpid™, RabbitMQ®, etc.), web server (e.g., Apache® HTTP Server™, Microsoft® Internet Information Services (IIS), Nginx, etc.), Session Initiation Protocol (SIP) server (e.g., Kamailio® SIP Server, Avaya® Aura® Application Server 5300, etc.), other media server (e.g., video and/or audio streaming, live broadcast, etc.), file server (e.g., Linux server, Microsoft® Windows Server®, etc.), service-oriented architecture (SOA) and/or microservices process, object-based storage (e.g., Lustre®, EMC® Centera, Scality® RING®, etc.), directory service (e.g., Microsoft® Active Directory®, Domain Name System (DNS) hosting service, etc.), and the like.

Each of VMs $260_1$-$260_V$ (FIG. 2) and containers $340_1$-$340_z$ can be referred to as workloads and/or endpoints. In contrast to hypervisor-based virtualization VMs $260_1$-$260_V$, containers $340_1$-$340_z$ may be an abstraction performed at the operating system (OS) level, whereas VMs are an abstraction of physical hardware. Since VMs $260_1$-$260_V$ can virtualize hardware, each VM instantiation of VMs $260_1$-$260_V$ can have a full server hardware stack from virtualized Basic Input/Output System (BIOS) to virtualized network adapters, storage, and central processing unit (CPU). The entire hardware stack means that each VM of VMs $260_1$-$260_V$ needs its own complete OS instantiation and each VM must boot the full OS.

Figure 4:
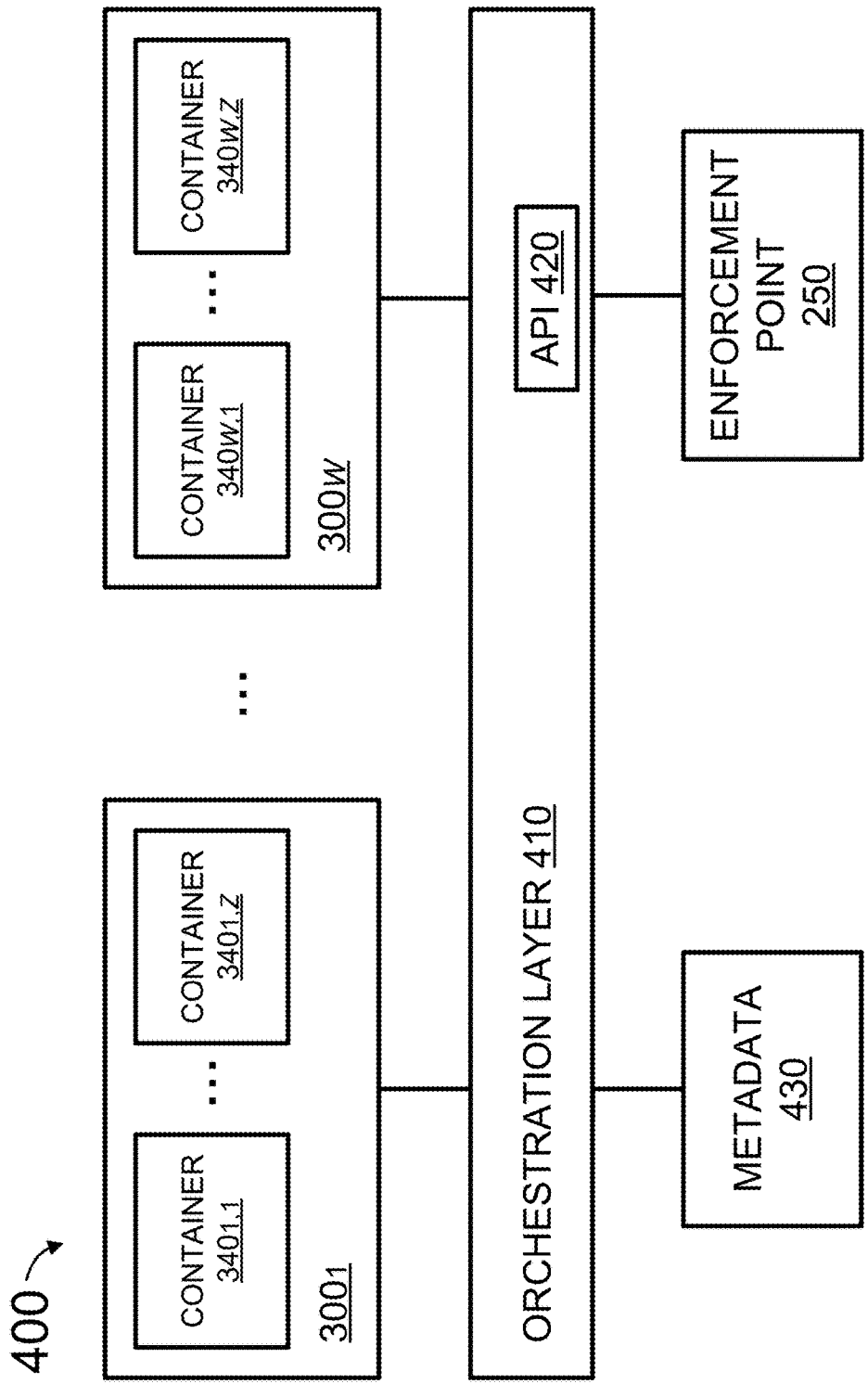
FIG. 4 is a simplified block diagram of an environment, in accordance with various embodiments.

FIG. 4 illustrates environment 400, according to some embodiments. Environment 400 can include one or more of enforcement point 250, environments $300_1$-$300_W$, orchestration layer 410, and metadata 430. Enforcement point 250 can be an enforcement point as described in relation to enforcement points $250_1$-$250_V$ (FIG. 2). Environments $300_1$-$300_W$ can be instances of environment 300 (FIG. 3), include containers $340_{1,1}$-$340_{W,Z}$, and be in at least one of data center 120 (FIG. 1). Containers $340_{1,1}$-$340_{W,Z}$ (e.g., in a respective environment of environments $300_1$-$300_W$) can be a container as described in relation to containers $340_1$-$340_Z$ (FIG. 3).

Orchestration layer 410 can manage and deploy containers $340_{1,1}$-$340_{W,Z}$ across one or more environments $300_1$-$300_W$ in one or more data centers of data center 120 (FIG. 1). In some embodiments, to manage and deploy containers $340_{1,1}$-$340_{W,Z}$, orchestration layer 410 receives one or more image types (e.g., named images) from a data storage and content delivery system referred to as a registry or hub (not shown in FIG. 4). By way of non-limiting example, the registry can be the Google Container Registry. In various embodiments, orchestration layer 410 determines which environment of environments $300_1$-$300_W$ should receive each container of containers $340_{1,1}$-$340_{W,Z}$ (e.g., based on the environments' $300_1$-$300_W$ current workload and a given redundancy target). Orchestration layer 410 can provide means of discovery and communication between containers $340_{1,1}$-$340_{W,Z}$. According to some embodiments, orchestration layer 410 runs virtually (e.g., in one or more containers $340_{1,1}$-$340_{W,Z}$ orchestrated by a different one of orchestration layer 410 and/or in one or more of hypervisor 230 (FIG. 2)) and/or physically (e.g., in one or more physical hosts of physical hosts $160_{1,1}$-$160_{x,y}$ (FIG. 1) in one or more of data center 120. By way of non-limiting example, orchestration layer 410 is at least one of Docker Swarm®, Kubernetes®, Cloud Foundry® Diego, Apache® Mesos™, and the like.

Orchestration layer 410 can maintain (e.g., create and update) metadata 430. Metadata 430 can include reliable and authoritative metadata concerning containers (e.g., containers $340_{1,1}$-$340_{W,Z}$). By way of non-limiting example, metadata 430 indicates for a container at least one of: an image name (e.g., file name including at least one of a network device (such as a host, node, or server) that contains the file, hardware device or drive, directory tree (such as a directory or path), base name of the file, type (such as format or extension) indicating the content type of the file, and version (such as revision or generation number of the file), an image type (e.g., including name of an application or service running), the machine with which the container is communicating (e.g., IP address, host name, etc.), and a respective port through which the container is communicating, and other tag and/or label (e.g., a (user-configurable) tag or label such as a Kubernetes® tag, Docker® label, etc.), and the like.

In various embodiments, metadata 430 is generated by orchestration layer 410—which manages and deploys containers—and can be very timely (e.g., metadata is available soon after an associated container is created) and highly reliable (e.g., accurate). Other metadata may additionally or alternatively comprise metadata 430. By way of non-limiting example, metadata 430 includes an application determination using application identification (AppID). AppID can process data packets at a byte level and can employ signature analysis, protocol analysis, heuristics, and/or behavioral analysis to identify an application and/or service. In some embodiments, AppID inspects only a part of a data payload (e.g., only parts of some of the data packets). By way of non-limiting example, AppID is at least one of Cisco Systems® OpenAppID, Qosmos ixEngine®, Palo Alto Networks® APP-ID™, and the like.

Enforcement point 250 can receive metadata 430, for example, through application programming interface (API) 420. Other interfaces can be used to receive metadata 430.

Figure 5:
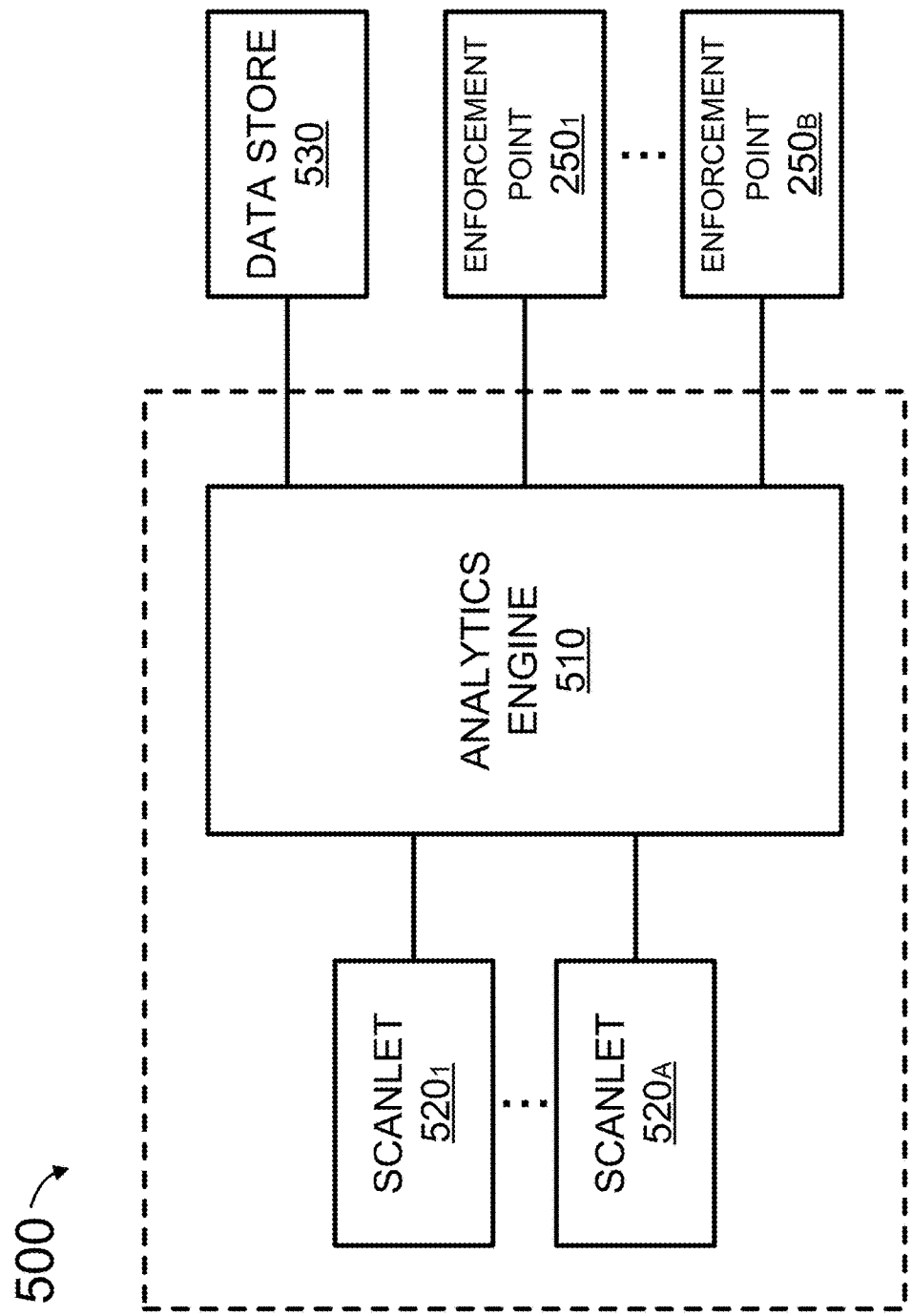
FIG. 5 is a simplified block diagram of a system, according to some embodiments.

FIG. 5 illustrates system 500 according to some embodiments. System 500 can include analytics engine 510, scanlets $520_1$-$520_A$, data store 530, and enforcement points $250_1$-$250_B$. Enforcement points $250_1$-$250_B$ can at least be enforcement points as described in relation to enforcement points $250_1$-$250_V$ (FIG. 2) and 250 (FIG. 4). Analytics engine 510 can receive and store metadata from enforcement points $250_1$-$250_B$. For example, metadata from enforcement points $250_1$-$250_B$ includes at least one of a source (IP) address and/or hostname, a source port, destination (IP) address and/or hostname, a destination port, protocol, application, username and/or other credentials used to gain access to computing resources on a network, number of bytes in communication between client-server and/or server-client, and the like. By way of further non-limiting example, metadata from enforcement point $250_1$-$250_B$ includes metadata 430 (FIG. 4).

In various embodiments, analytics engine 510 stores metadata in and receives metadata from data store 530. Data store 530 can be a repository for storing and managing collections of data such as databases, files, and the like, and can include a non-transitory storage medium (e.g., mass data storage 930, portable storage device 940, and the like described in relation to FIG. 9). Analytics engine 510 can be at least one of a physical host $160_{1,1}$-$160_{x,y}$ (FIG. 1), VM $260_1$-$260_V$ (FIG. 2), container $340_1$-$340_Z$ (FIG. 3), the like, and combinations thereof, in the same server (rack), different server (rack), different data center, and the like than scanlets $520_1$-$520_A$, data store 530, enforcement points $250_1$-$250_B$, and combinations thereof. In some embodiments, analytics engine 510 comprises scanlets $520_1$-$520_A$.

Scanlets $520_1$-$520_A$ are each designed/optimized to detect malicious activity, such as network enumeration (e.g., discovering information about the data center, network, etc.), vulnerability analysis (e.g., identifying potential ways of attack), and exploitation (e.g., attempting to compromise a system by employing the vulnerabilities found through the vulnerability analysis), for a particular protocol and/or application. By way of non-limiting example, one of scanlets $520_1$-$520_A$ is used to detect malicious activity in network communications using a particular protocol, such as (application-layer) protocols (e.g., Dynamic Host Configuration Protocol (DHCP), Domain Name System (DNS), File Transfer Protocol (FTP), Hypertext Transfer Protocol (HTTP), Internet Message Access Protocol (IMAP), Post Office Protocol (POP), Secure Shell (SSH), Secure Sockets Layer (SSL), Transport Layer Security (TLS), etc.). By way of further non-limiting example, one of scanlets $520_1$-$520_A$ is used to detect malicious activity in network communications using a certain application, such as applications described in relation to applications $280_1$-$280_V$ (FIG. 2) and applications $350_1$-$350_z$ (FIG. 3).

In some embodiments, scanlets $520_1$-$520_A$ are each a computer program, algorithm, heuristic function, hash, other (binary) string/pattern/signature, the like, and combinations thereof, which are used to detect malicious behavior. As vulnerabilities/exploits are discovered for a particular protocol and/or application, for example, by information technology (IT) staff responsible for security in a particular organization, outside cyber security providers, "white hat" hackers, academic/university researchers, and the like, the scanlet of scanlets $520_1$-$520_A$ associated with the particular protocol and/or application may be hardened (e.g., updated to detect the vulnerability/exploit).

By way of non-limiting example, a scanlet of scanlets $520_1$-$520_A$ associated with SMB is used to detect and/or analyze: certain syntax (e.g., psexec, which can be used for remote process execution), encryption, n-gram calculation of filenames, behavioral analytics on the source and/or destination nodes, and usage by the source and/or destination nodes of the SMB protocol. By way of further non-limiting example, a scanlet of scanlets $520_1$-$520_A$ associated with DNS is used to detect and/or analyze: n-gram calculation on a dns-query, TTL (Time to Live) value (e.g., analytics on normal value), response code (e.g., analytics on normal value), and usage by the source and/or destination nodes of the DNS protocol. By way of additional non-limiting example, a scanlet of scanlets $520_1$-$520_A$ associated with RDP is used to detect and/or analyze: known bad command, encryption, connection success rates, and usage by the source and/or destination nodes of the DNS protocol.

In this way, scanlets $520_1$-$520_A$ can be used to detect such malicious behaviors as when: a node which usually acts as a client (e.g., receives data) begins acting as a server (e.g., sends out data), a node begins using a protocol which it had not used before, commands known to be malicious are found inside communications (e.g., using at least partial packet inspection), and the like. By way of further non-limiting example, scanlets $520_1$-$520_A$ can be used to spot when: (known) malware is uploaded to a (network) node, user credentials are stolen, a server is set-up to steal user credentials, credit card data is siphoned off, and the like.

In operation, a scanlet of scanlets $520_1$-$520_A$ examines metadata from network communications, where the network communications use the protocol or application for which the scanlet is designed/optimized. When the examination of a particular instance of network communication is completed, the scanlet provides a risk score denoting a likelihood or confidence level the network communication was malicious. In various embodiments, the risk score is a range of numbers, where one end of the range indicates low/no risk and the other end indicates high risk. By way of non-limiting example, the risk score ranges from 1-10, where 1 denotes low/no risk and 10 denotes high risk. Other ranges of numbers (e.g., including fractional or decimal numbers) can be used. Low/no risk can be at either end of the range, so long as high risk is consistently at the opposite end of the range from low/no risk.

Risk scores generated by scanlets $520_1$-$520_A$ can be normalized to the same or consistent range of numbers. For example, scanlets $520_1$-$520_A$ can each return risk scores normalized to the same range of numbers and/or analytic engine 510 can normalize all risk scores received from scanlets $520_1$-$520_A$ (e.g., some of scanlets $520_1$-$520_A$ may produce risk scores using a different range of numbers than others of scanlets $520_1$-$520_A$) to the same range of numbers.

When malicious activity is suspected in a particular (network) node (referred to as a "primary node"), communications to and from the node can be examined for malicious activity. For example, a network node may be deemed to be suspicious, for example, because IT staff noticed suspicious network activity and/or a warning is received from a virus scanner or other malware detector, a cyber security provider, firewall 130 (FIG. 1), enforcement point 250 ($250_1$-$250_V$ and/or $250_1$-$250_B$; FIGS. 2, 4, and 5), or other security mechanism. A (network) node can be at least one of a physical host $160_{1,1}$-$160_{x,y}$ (FIG. 1), VM $260_1$-$260_V$ (FIG. 2), container $340_1$-$340_z$ (FIG. 3), client system, other computing system on a communications network, and combinations thereof.

In some embodiments, analytics engine 510 retrieves metadata stored in data store 530 concerning communications to and from the node. For example, the metadata can include: a source (IP) address and/or hostname, a source port, destination (IP) address and/or hostname, a destination port, protocol, application, username and/or other credentials used to gain access, number of bytes in communication between client-server and/or server-client, metadata 430 (FIG. 4), and the like. By way of further non-limiting example, the amount of metadata retrieved can be narrowed to a certain time period (e.g., second, minutes, days, weeks, months, etc.) using a (user-configurable) start date, start time, end date, end time, and the like. Since a given protocol may be used on the order of tens of thousands of times per minute in a data center, narrowing the metadata received can be advantageous.

For each communication into or out of the node, analytics engine 510 can identify a protocol and/or application used. Using the identified protocol and/or application, analytics engine 510 can apply a scanlet of scanlets $520_1$-$520_A$ associated with the protocol and/or a scanlet associated with the application. Analytics engine 510 compares the risk score returned from the scanlet of scanlets $520_1$-$520_A$. When the risk score exceeds a (user-configurable) pre-determined first threshold, the communication and its source or destination (referred to as a "secondary node") can be identified as malicious. The first threshold can be a whole and/or fractional number. Depending of the range of values of the risk score and which end of the range is low or high risk, the risk score can deceed a (user-configurable) pre-determined threshold to identify the communication and its source or destination as potentially malicious. The secondary node identified as malicious and an identifier associated with the malicious communication can be stored. Additionally, other information such as the risk score, time stamp, direction (e.g., source and destination), description of the malicious behavior, and the like may also be stored.

In some embodiments, once communications to and from the primary node are examined, analytics engine 510 recursively examines communications to and from the malicious secondary nodes using appropriate scanlets of scanlets $520_1$-$520_A$. Recursive examination can be similar to the examination described above for communications to and from the primary node, where a result of the immediately preceding examination is used in the present examination. For example, analytics engine 510 retrieves metadata stored in data store 530 concerning communications to and from the malicious secondary nodes, narrowed to a particular time period. By way of further example, when the risk score exceeds a (user-configurable) pre-determined first threshold, the communication and its source or destination (referred to as a "tertiary node") can be identified as malicious. The tertiary node identified as malicious, an identifier associated with the malicious communication, and/or other information can be stored (e.g., in data store 530). Examination of communications to or from the primary node (e.g., communications to which a scanlet has already been applied and/or for which a risk score has already been received) can be skipped to prevent redundancy.

Recursive examination can continue as described above to examine communications to and from the malicious tertiary nodes (then quaternary nodes, quinary nodes, senary nodes, etc.). For each iteration, when the risk score exceeds a (user-configurable) pre-determined threshold, the communication and its source or destination can be identified as malicious. The node identified as malicious, an identifier associated with the malicious communication, and/or other information can be stored (e.g., in data store 530). Communications to which a scanlet has already been applied and/or for which a risk score has already been received may be skipped to prevent redundancy.

In some embodiments, the recursive examination continues until a particular (user-defined) depth or layer is reached. For example, the recursive examination stops once the secondary nodes (or tertiary nodes or quaternary nodes or quinary nodes or senary nodes, etc.) are examined. By way of further non-limiting example, the recursive examination stops once at least one of: a (user-defined) pre-determined number of malicious nodes is identified, a (user-defined) pre-determined amount of time for the recursive examination, is reached. In various embodiments, the recursive examination continues until a limit is reached. For example, after multiple iterations new nodes (and/or communications) are not present in the metadata retrieved, because they were already examined at a prior level or depth. In this way, the recursive examination can be said to have converged on a set of malicious nodes (and communications).

Information about communications not deemed malicious (e.g., identifier, nodes communicating, risk score, time stamp, direction, description of malicious behavior, and the like for each communication), such as when the risk score is not above the (user-defined) predetermined threshold (referred to as a first threshold), may also be stored (e.g., in data store 530). In some embodiments, all communications examined by analytics engine 510 are stored. In various embodiments, communications having risk scores "close" to the first threshold but not exceeding the first threshold are stored. For example, information about communications having risk scores above a second threshold but lower than the first threshold can be stored (e.g., in data store 530) for subsequent holistic analysis.

Throughout the recursive examination described above, at least some of the communications originating from or received by a particular node may not exceed the first (user-defined) predetermined threshold and the node is not identified as malicious. However, two or more of the communications may have been "close" to the first predetermined threshold. For example, the communications have risk scores above a second threshold but lower than the first threshold.

Although individual communications may not (be sufficient to) indicate the node (and individual communications) are malicious, a group of communications "close" to the threshold can be used to identify the node (and individual communications) as malicious. For example, if a number of communications having risk scores above the second threshold but below the first threshold (referred to as "marginally malicious") exceeds a (user-defined) predetermined threshold (referred to as a "third threshold"), then the node (and the marginally malicious communications) are identified as malicious. The second threshold can be a whole and/or fractional number.

In some embodiments, all nodes have a risk score. As described in relation to risk scores for communications, risk scores for nodes can be any range of numbers and meaning. For example, as each communication a particular node participates in receives a normalized risk score from a scanlet and the risk score for the node is an average (e.g., arithmetic mean, running or rolling average, weighted average where each scanlet is assigned a particular weight, and the like) of the communication risk scores. By way of further non-limiting example, when the average exceeds a (user-defined) predetermined second threshold, then the node is identified as malicious.

The node identified as malicious, identifiers associated with the malicious communications, a notation that the malicious node (and malicious communications) were identified using a number of marginally malicious communications or node risk score, and/or other information can be stored (e.g., in data store 530).

Figure 6A:
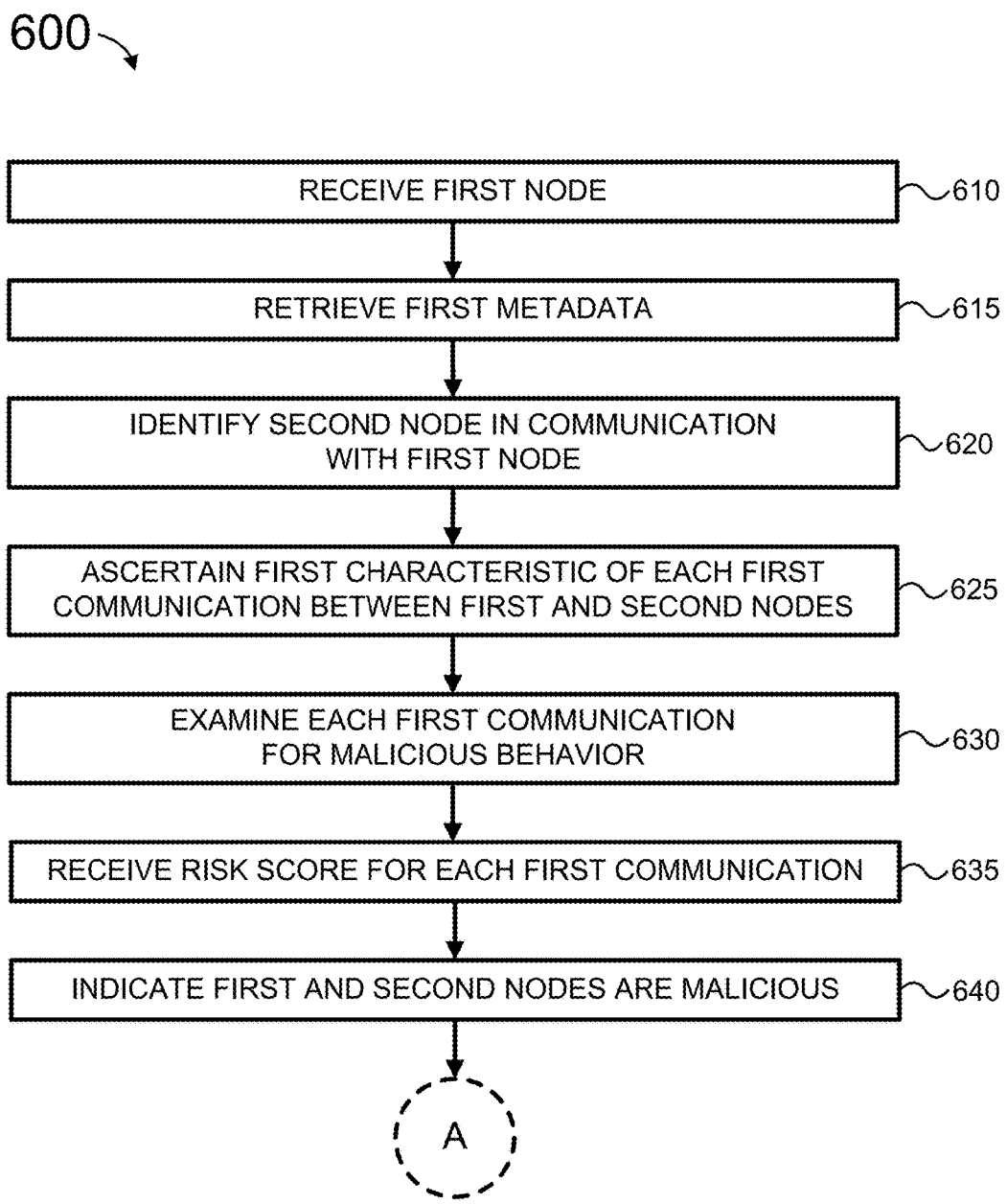
FIGS. 6A and 6B are a simplified block diagram of an environment, in accordance with some embodiments.
Figure 6B:
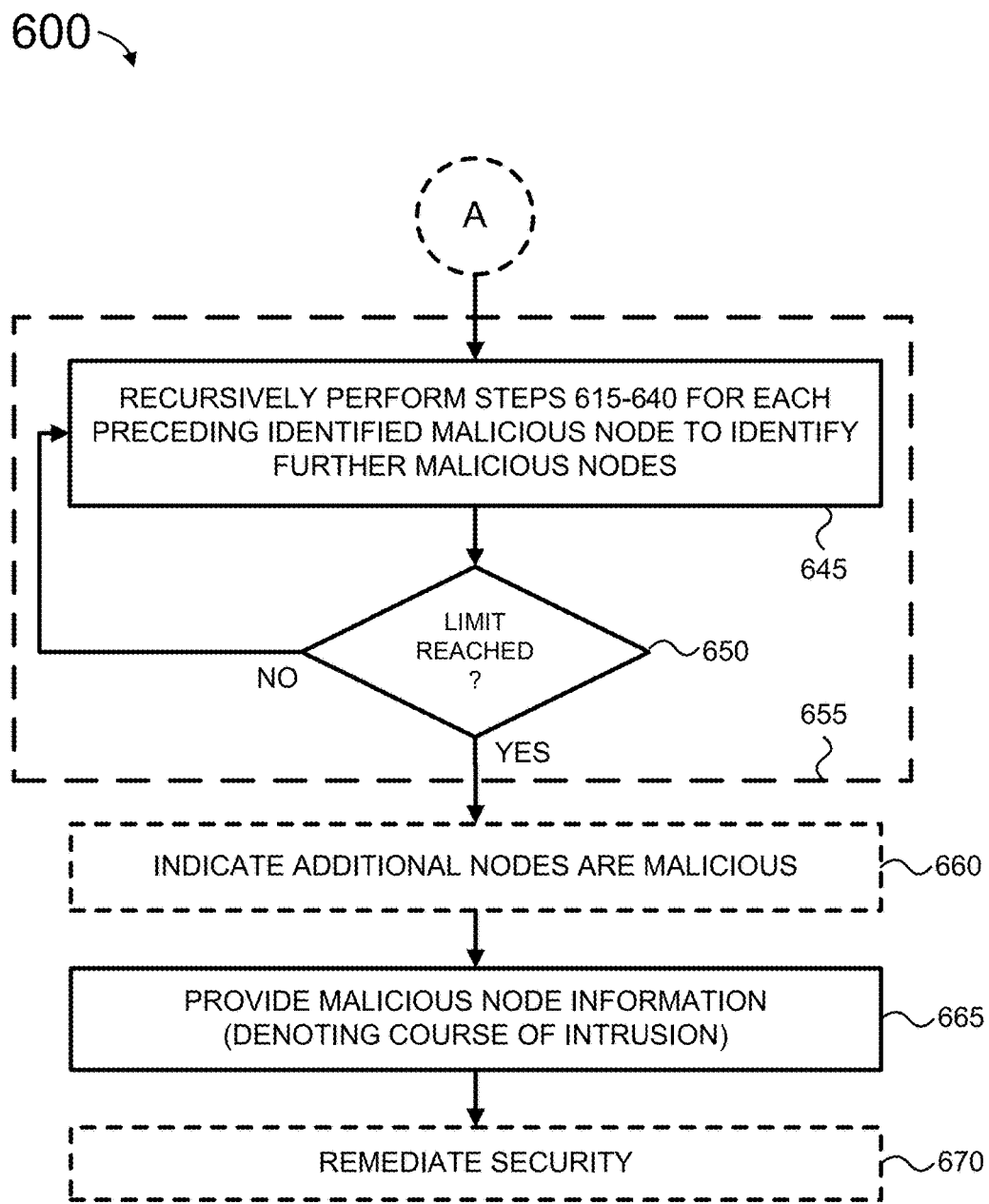

FIGS. 6A and 6B illustrate a method 600 for recursive examination according to some embodiments. Method 600 may be performed at least in part using analytics engine 510 (FIG. 5). At step 610, a first identifier for a first node can be received. The first identifier for the first node can be received from a user, virus scanner or other malware detector, a cyber security provider, firewall 130 (FIG. 1), point 250 ($250_1$-$250_V$ and/or $250_1$-$250_B$; FIGS. 2, 4, and 5), or other security mechanism. The first identifier can be an IP address, hostname, and the like. At step 615, first metadata associated with communications received and/or provided by the first node can be retrieved. For example, communications which occurred during a user-defined period of time can be retrieved from data store 530.

At step 620, at least one second node and at least one associated communication in communication with the first node is identified, for example, using the retrieved metadata. The at least one second node can be identified using an identifier such as an IP address, hostname, and the like. At step 625, a characteristic of each identified communication is ascertained. For example, the characteristic is a protocol and/or application used in the communication.

At step 630, each of the identified communications are examined for malicious behavior, for example, using a scanlet of scanlets $520_1$-$520_4$. For example, using the ascertained characteristic, a scanlet of scanlets $520_1$-$520_4$ associated with the characteristic is selected for the examination and applied to the communication. At step 635, a risk score associated with each communication is received, for example, from the applied scanlet of scanlets $520_1$-$520_4$.

At step 640, second nodes are identified as malicious. For example, when a risk score exceeds a predetermined threshold, the associated node (and corresponding communication) are identified as malicious.

At step 645, each of the second nodes can be recursively analyzed. For example, steps 615 through 640 are performed for each of the second nodes and third nodes are identified as malicious. The third nodes can be identified using an identifier such as an IP address, hostname, and the like. Also at step 645, each of the third nodes can be recursively analyzed. For example, steps 615 through 640 are performed for each of the third nodes, and fourth nodes are identified as malicious. Further at step 645, each of the fourth nodes can be recursively analyzed. For example, steps 615 through 640 are performed for each of the fourth nodes, and fifth nodes are identified as malicious. And so on, until a limit is reached (step 650).

At step 650, a check to see if the limit is reached can be performed. For example, a limit is a (user-configurable) depth, level, or number of iterations; period of time for recursive examination; number of malicious nodes identified; when the set of malicious nodes converges; and the like. When a limit is not reached, another recursion or iteration can be performed (e.g., method 600 recursively repeats step 645). When a limit is reached, method 600 can continue to step 660). Steps 645 and 650 (referred to collectively as step 655) are described further with respect to FIGS. 7A and 7B.

At step 660, additional nodes are optionally identified as malicious. For example, a node is identified as malicious when a number of marginally malicious communications (as described above in relation to FIG. 5) associated with the node exceeds a predetermined limit.

At step 665, the malicious nodes (and associated malicious communications) can be generated and provided. For example, a report including the malicious nodes and associated communications is produced. A non-limiting example of a graphical representation of the malicious nodes and their communication relationships is described further with respect to FIG. 8.

At step 670, remediation can be optionally performed. Using the recursive multi-layer examination described above in relation to FIGS. 5-7B, remediation can block the particular breach/attack, as well as similar breaches/attacks using the same or similar methodology, when it is still in progress. For example, remediation includes at least one of: quarantining particular nodes (e.g., certain nodes are not allowed to communicate with each other), re-imaging particular nodes, banning particular applications and/or protocols from a particular data center or network (e.g., when there is no business rationale to permit it), updating a security policy (which allowed the breach/attack to occur), and the like.

In some embodiments, a security policy can be low-level (e.g., firewall rules, which are at a low level of abstraction and only identify specific machines by IP address and/or hostname). Alternatively or additionally, a security policy can be at a high-level of abstraction (referred to as a "high-level declarative security policy"). A high-level security policy can comprise one or more high-level security statements, where there is one high-level security statement per allowed protocol, port, and/or relationship combination. The high-level declarative security policy can be at least one of: a statement of protocols and/or ports the primary physical host, VM, or container is allowed to use, indicate applications/services that the primary physical host, VM, or container is allowed to communicate with, and indicate a direction (e.g., incoming and/or outgoing) of permitted communications.

A high-level security policy can comprise one or more high-level security statements, where there is one high-level security statement per allowed protocol, port, and/or relationship combination. The high-level declarative security policy can be at least one of: a statement of protocols and/or ports the primary VM or container is allowed to use, indicate applications/services that the primary VM or container is allowed to communicate with, and indicate a direction (e.g., incoming and/or outgoing) of permitted communications.

The high-level declarative security policy is at a high level of abstraction, in contrast with low-level firewall rules, which are at a low level of abstraction and only identify specific machines by IP address and/or hostname. Accordingly, one high-level declarative security statement can be compiled to produce hundreds or more of low-level firewall rules. The high-level security policy can be compiled by analytics engine 510 (FIG. 5), enforcement point 250 ($250_1$-$250_V$ and/or $250_1$-$250_B$; FIGS. 2, 4, and 5), or other machine to produce a low-level firewall rule set. Compilation is described further in related United States Patent Application "Conditional Declarative Policies" (application Ser. No. 14/673,640) filed Mar. 30, 2015, which is hereby incorporated by reference for all purposes.

Figure 7A:
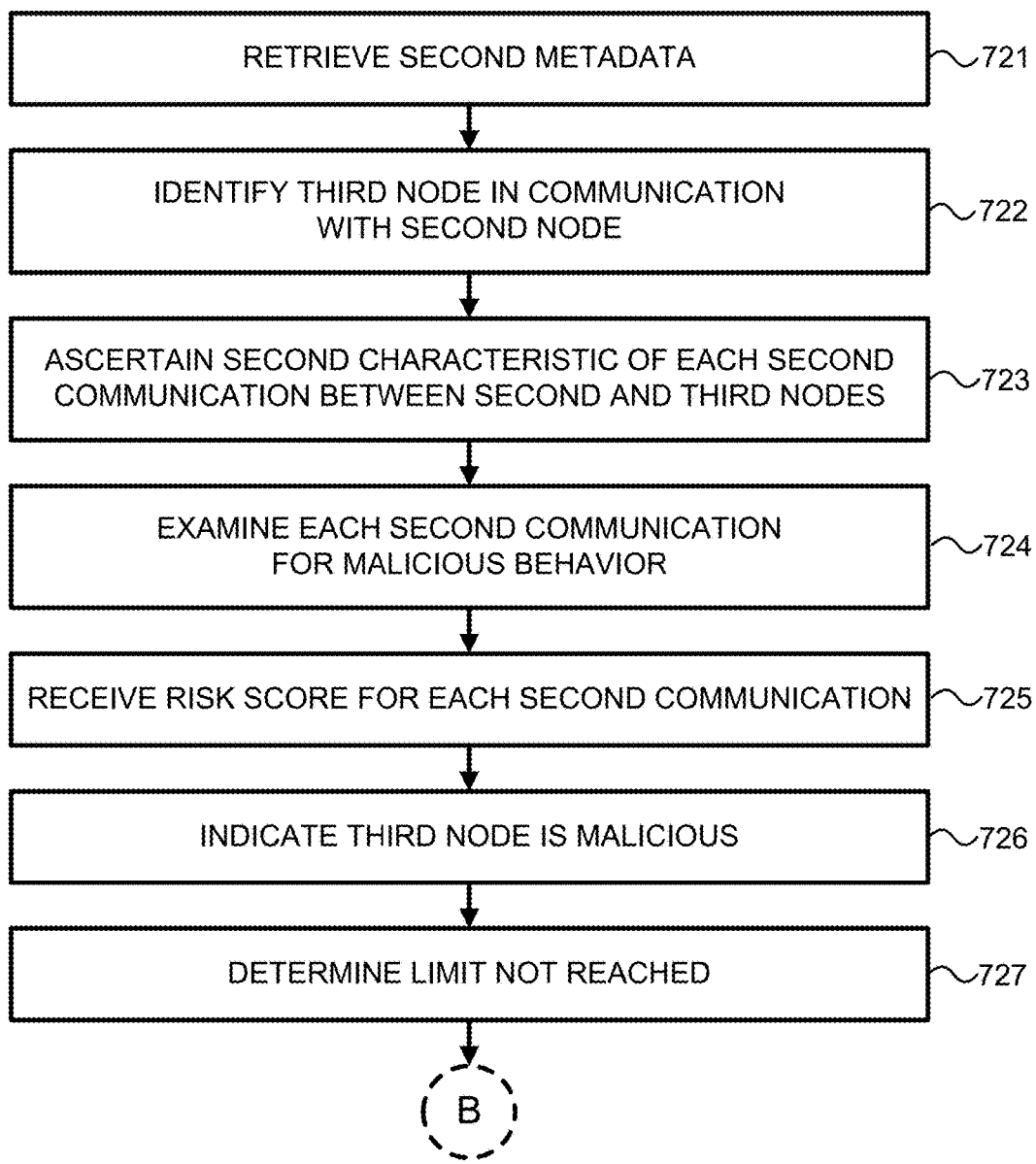
FIGS. 7A and 7B are a flow diagram, according to various embodiments.
Figure 7B:
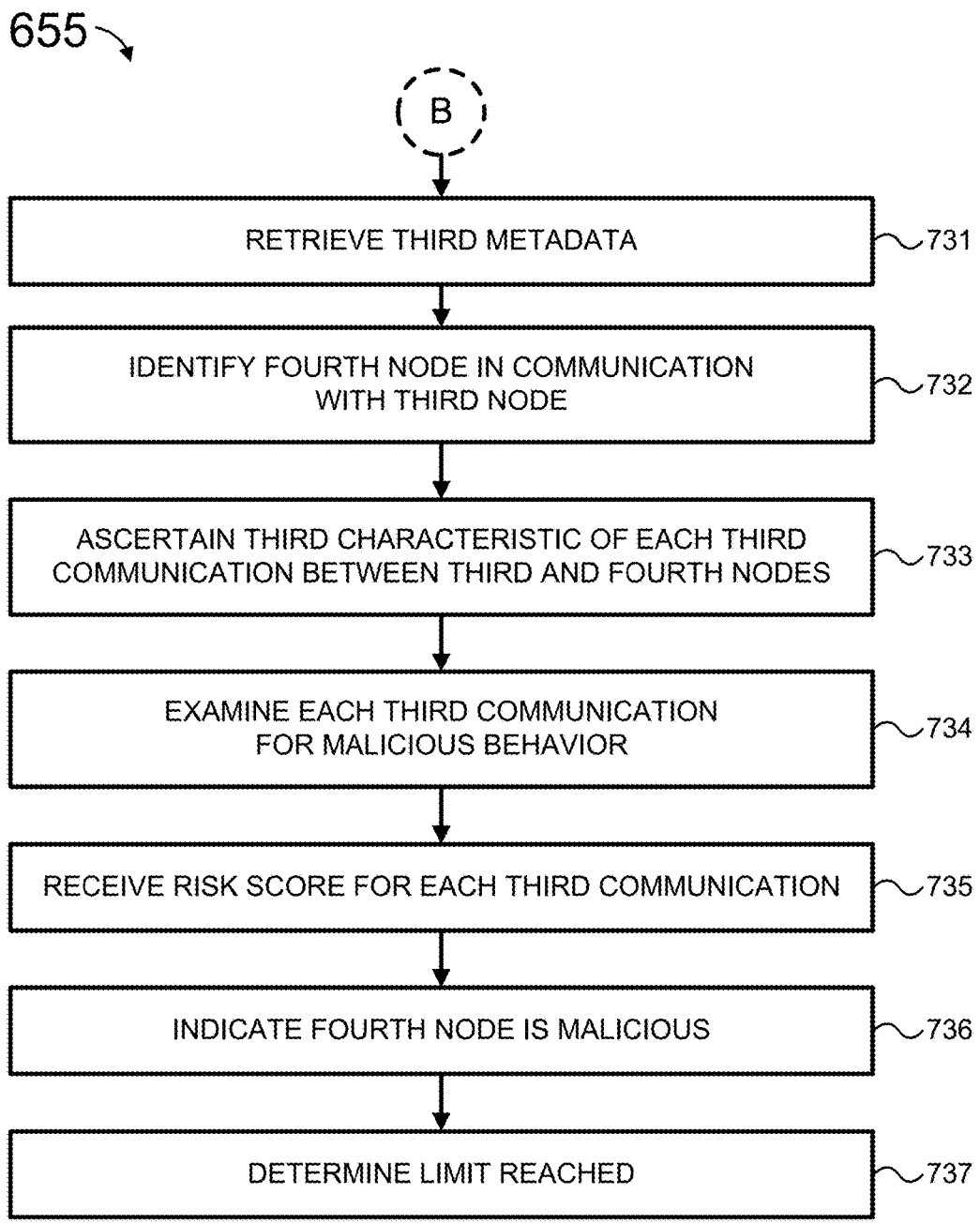

FIGS. 7A and 7B show further example details for step 655 (FIG. 6B) performing two recursions or iterations, according to some embodiments. At step 721, second metadata, associated with second communications received or provided by each malicious second node, can be retrieved. For example, second communications which occurred during a user-defined period of time can be retrieved from data store 530.

At step 722, at least one third node (and corresponding second communication) in communication with each malicious second node is identified, for example, using the retrieved second metadata. At step 723, a second characteristic of each identified second communication is ascertained. For example, the characteristic is a protocol and/or application used in the second communication.

At step 724, each of the identified second communications are examined for malicious behavior, for example, using a scanlet of scanlets $520_1$-$520_A$ (FIG. 5). For example, using the ascertained second characteristic, a scanlet of scanlets $520_1$-$520_A$ associated with the second characteristic is selected for the examination and applied. At step 725, a risk score associated with each second communication is received, for example, from the applied scanlet of scanlets $520_1$-$520_A$.

At step 726, third nodes are identified as malicious. For example, when a risk score exceeds a predetermined threshold, the associated third node (and corresponding second communication) are identified as malicious.

At step 727, a determination is made that a limit has not been reached. For example, step 650 (FIG. 6B) determines a limit is not reached. A limit may be a (user-configurable) depth, level, or number of iterations; period of time for recursive examination; number of malicious nodes identified; when the set of malicious nodes converges; and the like. In some embodiments, when a limit is not reached, another iteration or recursion is performed. Since the example of FIGS. 7A and 7B supposes two recursions or iterations, the process depicted in FIGS. 7A and 7B continues to step 731.

At step 731, third metadata associated with second communications received or provided by each malicious third node can be retrieved. For example, third communications which occurred during a user-defined period of time can be retrieved from data store 530.

At step 732, at least one fourth node (and corresponding third communication) in communication with each malicious third node is identified, for example, using the retrieved third metadata. The at least one fourth node can be identified using an identifier such as an IP address, hostname, and the like. At step 733, a third characteristic of each identified third communication is ascertained. For example, the third characteristic is a protocol and/or application used in the third communication.

At step 734, each of the identified third communications are examined for malicious behavior, for example, using a scanlet of scanlets $520_1$-$520_A$. For example, using the ascertained third characteristic, a scanlet of scanlets $520_1$-$520_A$ associated with the third characteristic is selected for the examination and applied. At step 735, a risk score associated with each third communication is received, for example, from the applied scanlet of scanlets $520_1$-$520_A$.

At step 736, fourth nodes are identified as malicious. For example, when a risk score exceeds a predetermined threshold, the associated fourth node (and corresponding third communication) are identified as malicious.

At step 737, a determination is made that a limit has been reached. For example, step 650 (FIG. 6B) determines a limit is reached. A limit may be a (user-configurable) depth, level, or number of iterations; period of time for recursive examination; number of malicious nodes identified; when the set of malicious nodes converges; and the like. In some embodiments, when a limit is reached, another iteration or recursion is not performed. Since the example of FIGS. 7A and 7B supposes two recursions or iterations, the process depicted in FIGS. 7A and 7B continues to step 731.

While two iterations or recursions are depicted in FIGS. 7A and 7B, other numbers of recursions or iterations can be used to reach a limit. In various embodiments, a check (e.g., step 650 in FIG. 6B) is performed after each iteration (e.g., steps 727 and 737) to determine if the limit is reached. When a limit is not reached, another recursion or iteration can be performed. When a limit is reached, another recursion or iteration may not be performed and the process shown in FIGS. 7A and 7B continues to step 660 of method 600 (FIG. 6B).

Figure 8:
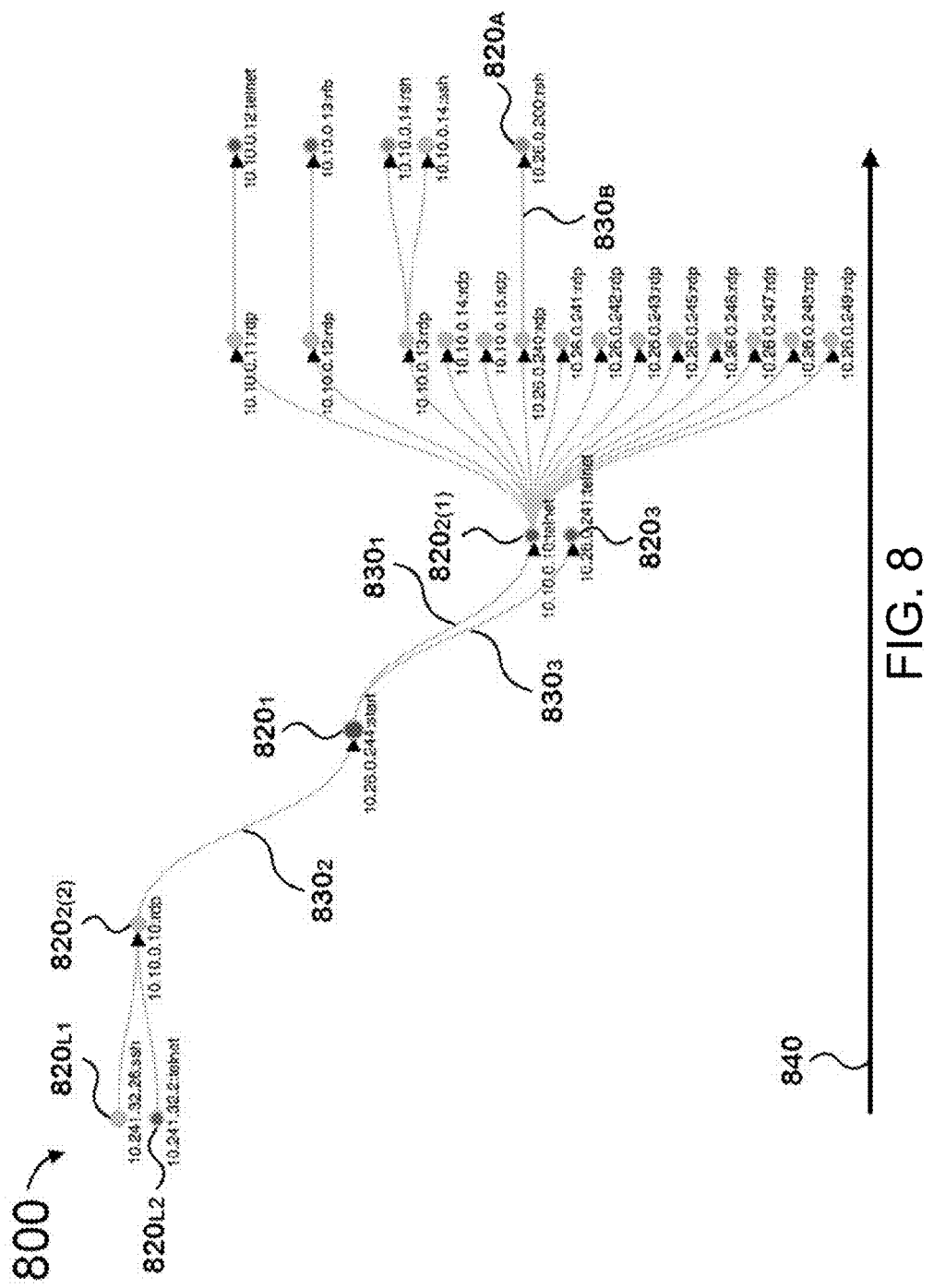
FIG. 8 is a graphical representation of malicious relationships, in accordance with various embodiments.

FIG. 8 is a graphical representation (graph) 800 of the malicious nodes and their communication relationships. Each malicious node is represented (plotted) by a point (e.g., nodes $820_{1-A}$) in graph 800. Each malicious communication is represented (drawn) by a line or edge (e.g., communications $830_{1-B}$) in graph 800. Properties such as a respective protocol, application, statistical properties (e.g., number of incoming/outgoing bytes), risk score, other description of why the communication was deemed malicious, direction (e.g., inbound, outbound, lateral, etc.), other metadata, and the like can be associated with each of communications $830_{1-B}$. By way of non-limiting example, node $820_3$ shows properties such as an (IP) address, and application or protocol associated with communication $830_3$. By way of further non-limiting example, each of nodes $820_{1-A}$ can be colored (not depicted in FIG. 8), such that each application and/or protocol is indicated by a particular color. In some embodiments, graph 800 may be provided interactively, such that when receiving an indication or selection from a user (e.g., hovering a pointer over (and optionally clicking on), touching on a touchscreen, and the like on a particular point or edge), properties associated with the indicated node(s) and/or communication(s) are displayed (e.g., in a pop-up window, balloon, infobar, sidebar, status bar, etc.).

In some embodiments, a node may be represented on graph 800 more than once. By way of non-limiting example, node $820_2$ having (IP) address 10.10.0.10 is represented by $820_{2(1)}$ and $820_{2(1)}$. A particular network may have only one node having address 10.10.0.10, and $820_{2(1)}$ and $820_{2(1)}$ refer to the same node. $820_{2(1)}$ and $820_{2(1)}$ can be dissimilar in that that each has a different malicious communication with node $820_1$. For example, $820_{2(1)}$ is in communication with node $820_1$ through communication $830_1$, and $820_{2(2)}$ is in communication with node $820_1$ through communication $830_2$. Here, communication $830_1$ is outbound from $820_1$ using telnet, and communication $830_2$ is inbound to $820_1$ using RDP.

As shown in FIG. 8, progress 840 of an intrusion via instances of malicious communications/behavior (e.g., infection sometimes referred to as a "kill chain") over time is depicted beginning at a left side and proceeding to a right side of FIG. 8. Accordingly, the first node subject to an intrusion (e.g., infection, compromise, etc.) is depicted by a nodes $820_{L1}$ and $820_{L2}$, being farthest to the left in FIG. 8. Here, more than one node (e.g., nodes $820_{L1}$ and $820_{L2}$) may be the origin of an intrusion or security breach. Nodes $820_{L1}$ and $820_{L2}$ may be referred to as the "primary case" or "patient zero." Point $820_1$ is the primary node (e.g., starting node of the recursive examination described above in relation to FIGS. 5-7). Depending on the circumstances of a particular kill chain, node $820_1$ and at least one of nodes $820_{L1}$ and $820_{L2}$ can be the same point or different points.

Figure 9:
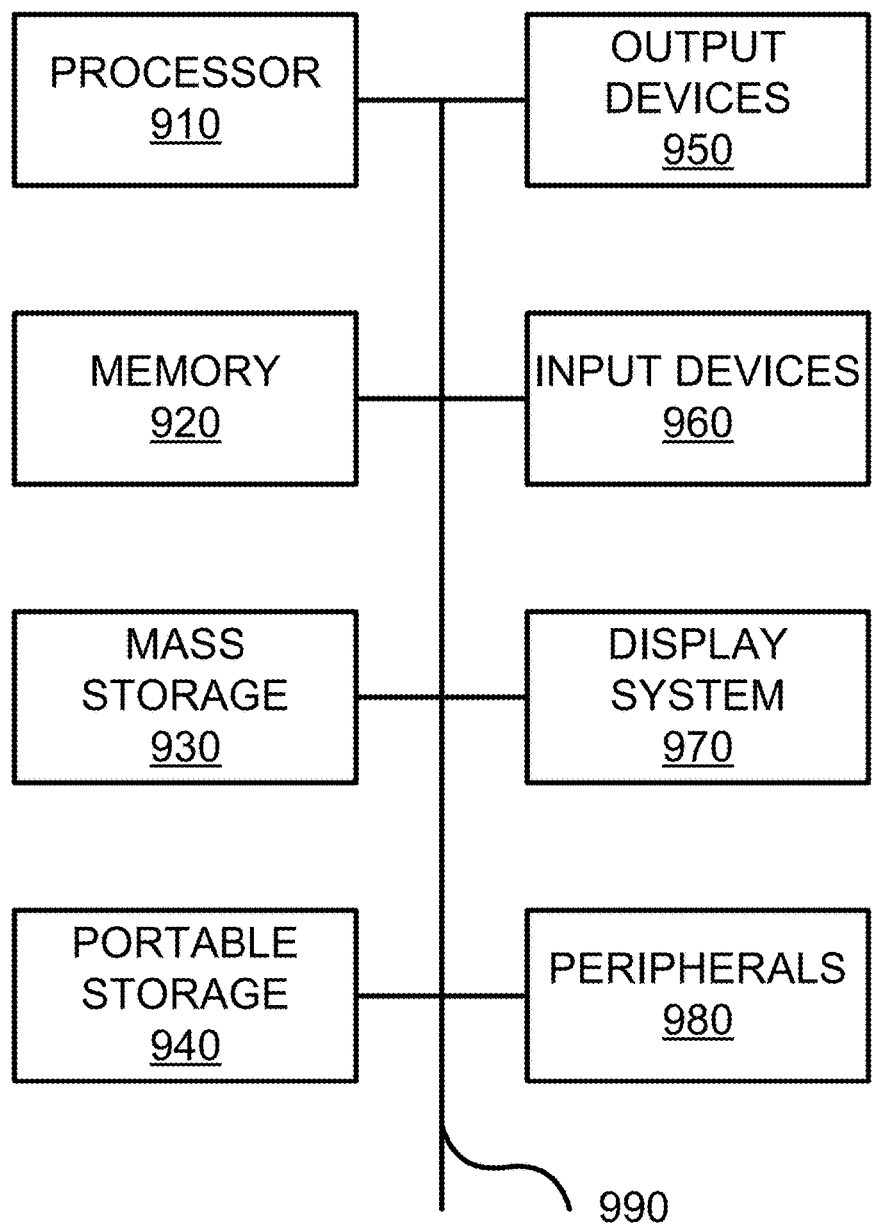
FIG. 9 is a simplified block diagram of a computing system, according to some embodiments.

FIG. 9 illustrates an exemplary computer system 900 that may be used to implement some embodiments of the present invention. The computer system 900 in FIG. 9 may be implemented in the contexts of the likes of computing systems, networks, servers, or combinations thereof. The computer system 900 in FIG. 9 includes one or more processor unit(s) 910 and main memory 920. Main memory 920 stores, in part, instructions and data for execution by processor unit(s) 910. Main memory 920 stores the executable code when in operation, in this example. The computer system 900 in FIG. 9 further includes a mass data storage 930, portable storage device 940, output devices 950, user input devices 960, a graphics display system 970, and peripheral device(s) 980.

The components shown in FIG. 9 are depicted as being connected via a single bus 990. The components may be connected through one or more data transport means. Processor unit(s) 910 and main memory 920 are connected via a local microprocessor bus, and the mass data storage 930, peripheral device(s) 980, portable storage device 940, and graphics display system 970 are connected via one or more input/output (I/O) buses.

Mass data storage 930, which can be implemented with a magnetic disk drive, solid state drive, or an optical disk drive, is a non-volatile storage device for storing data and instructions for use by processor unit(s) 910. Mass data storage 930 stores the system software for implementing embodiments of the present disclosure for purposes of loading that software into main memory 920.

Portable storage device 940 operates in conjunction with a portable non-volatile storage medium, such as a flash drive, floppy disk, compact disk, digital video disc, or Universal Serial Bus (USB) storage device, to input and output data and code to and from the computer system 900 in FIG. 9. The system software for implementing embodiments of the present disclosure is stored on such a portable medium and input to the computer system 900 via the portable storage device 940.

User input devices 960 can provide a portion of a user interface. User input devices 960 may include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 as shown in FIG. 9 includes output devices 950. Suitable output devices 950 include speakers, printers, network interfaces, and monitors.

Graphics display system 970 include a liquid crystal display (LCD) or other suitable display device. Graphics display system 970 is configurable to receive textual and graphical information and processes the information for output to the display device.

Peripheral device(s) 980 may include any type of computer support device to add additional functionality to the computer system.

The components provided in the computer system 900 in FIG. 9 are those typically found in computer systems that may be suitable for use with embodiments of the present disclosure and are intended to represent a broad category of such computer components that are well known in the art. Thus, the computer system 900 in FIG. 9 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 900 may be implemented as a cloud-based computing environment, such as a virtual machine operating within a computing cloud. In other embodiments, the computing system 900 may itself include a cloud-based computing environment, where the functionalities of the computing system 900 are executed in a distributed fashion. Thus, the computing system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for recursive multi-layer examination for computer network security remediation comprising:
   identifying one or more first communications originating from or directed to a first node;
   identifying at least one of a protocol and an application used for each of the one or more first communications;
   examining each of the one or more first communications for malicious behavior using a respective first scanlet of one or more scanlets, the respective first scanlet associated with the at least one of the protocol and the application used for the each of the one or more first communications;
   receiving a first risk score from the respective first scanlet for each of the one or more first communications responsive to the examining of the each of the one or more first communications;
   determining the first risk score associated with one of the one or more first communications exceeds a first predetermined threshold;
   indicating the first node and a second node in communication with the first node via the one or more first communications are malicious;
   identifying one or more second communications originating from or directed to the second node;
   identifying at least one of a protocol and an application used for each of the one or more second communications;
   examining each of the one or more second communications for malicious behavior using a respective second scanlet of the one or more scanlets, the respective second scanlet associated with the at least one of the protocol and the application used for the each of the one or more second communications;
   receiving a second risk score from the respective second scanlet for each of the one or more second communications responsive to the examining of the each of the one or more second communications;
   determining the second risk score associated with one of the one or more second communications exceeds the first predetermined threshold;
   indicating a third node in communication with the second node via the one of the one or more second communications is malicious;
   providing the indicated malicious nodes and communications originating from or directed to the indicated malicious nodes, such that progress of a security breach or intrusion through the indicated malicious nodes and communications is indicated;
   remediating the security breach;
   assigning a node risk score to an additional second node in which additional second risk scores, for additional second communications originating from or directed to the additional second node, do not exceed the first predetermined threshold, the node risk score being an average of the additional second risk scores; and
   determining the node risk score exceeds a second predetermined threshold and indicating the additional second node is malicious.

2. The method of claim 1, further comprising:
   identifying one or more third communications originating from or directed to the third node;
   identifying at least one of a protocol and an application used for each of the one or more third communications;
   examining each of the one or more third communications for malicious behavior using a respective third scanlet of the one or more scanlets, the respective third scanlet associated with the at least one of the protocol and the application used for the each of the one or more third communications;
   receiving a third risk score from the respective third scanlet for each of the one or more third communications responsive to the examining of the each of the one or more third communications;
   determining the third risk score associated with one of the one or more third communications exceeds the first predetermined threshold; and
   indicating a fourth node in communication with the third node via the one of the one or more third communications is malicious.

3. The method of claim 2, wherein another one of the one or more third communications is not examined if the another one of the one or more third communications is the same as one of the one or more first or second communications.

4. The method of claim 1, wherein each of the first and second nodes is at least one of a physical host, virtual machine, container, client system, and other computing system on a communications network.

5. The method of claim 1, wherein the identifying of the one or more first communications uses first metadata retrieved from the first node using a first identifier, and wherein the identifying of the one or more second communications uses second metadata retrieved from the second node using a second identifier.

6. The method of claim 5, wherein each of the first and second metadata includes information logged by an enforcement point.

7. The method of claim 5, wherein each of the first and second metadata comprises at least one of a source (IP) address and/or hostname, source port, destination (IP) address and/or hostname, destination port, protocol, application, username and/or other credentials used to gain access to computing resources on a network, and number of bytes in a communication.

8. The method of claim 1, wherein each of the one or more scanlets detects malicious activity in network communications using at least one of a particular protocol and a particular application.

9. The method of claim 1, wherein each of the first and second risk scores and the first predetermined threshold is a number within a predetermined range of numbers.

10. An analytic engine comprising:
a processor; and
a memory coupled to the processor, the memory storing instructions executable by the processor to perform the following operations for recursive multi-layer examination for computer network security remediation:
identifying one or more first communications originating from or directed to a first node;
identifying at least one of a protocol and an application used for each of the one or more first communications;
examining each of the one or more first communications for malicious behavior using a respective first scanlet of one or more scanlets, the respective first scanlet associated with the at least one of the protocol and the application used for the each of the one or more first communications;
receiving a first risk score from the respective first scanlet for each of the one or more first communications responsive to the examining of the each of the one or more first communications;
determining the first risk score associated with one of the one or more first communications exceeds a first predetermined threshold;
indicating the first node and a second node in communication with the first node via the one of the one or more first communications are malicious;
identifying one or more second communications originating from or directed to the second node;
identifying at least one of a protocol and an application used for each of the one or more second communications;
examining each of the one or more second communications for malicious behavior using a respective second scanlet of the one or more scanlets, the respective second scanlet associated with the at least one of the protocol and the application used for the each of the one or more second communications;
receiving a second risk score from the respective second scanlet for each of the one or more second communications responsive to the examining of the each of the one or more second communications;
determining the second risk score associated with one of the one or more second communications exceeds the first predetermined threshold;
indicating a third node in communication with the second node via the one of the one or more second communications is malicious;
providing the indicated malicious nodes and communications originating from or directed to the indicated malicious nodes, such that progress of a security breach or intrusion through the indicated malicious nodes and the communications is indicated;
remediating the security breach;
assigning a node risk score to an additional second node in which additional second risk scores, for additional second communications originating from or directed to the additional second node, do not exceed the first predetermined threshold, the node risk score being an average of the additional second risk scores; and
determining the node risk score exceeds a second predetermined threshold and
indicating the additional second node is malicious.

11. The analytic engine of claim 10, wherein the memory stores further instructions executable by the processor to perform the following operations:
identifying one or more third communications originating from or directed to the third node;
identifying at least one of a protocol and an application used for each of the one or more third communications;
examining the each of the one or more third communications for malicious behavior using a respective third scanlet of the one or more scanlets, the respective third scanlet associated with the at least one of the protocol and the application used for the each of the one or more third communications;
receiving a third risk score for the each of the one or more third communications responsive to the examining of the each of the one or more third communications;
determining the third risk score associated with one of the one or more third communications exceeds the first predetermined threshold; and
indicating a fourth node in communication with the third node via the one or more third communications is malicious.

12. The analytic engine of claim 11, wherein another one of the one or more third communications is not examined if the another one of the one or more third communications is the same as one of the one or more first or second communications.

13. The analytic engine of claim 10, wherein each of the first and second nodes is at least one of a physical host, virtual machine, container, client system, and other computing system on a communications network.

14. The analytic engine of claim 10, wherein the identifying of the one or more first communications uses first metadata retrieved from the first node using a first identifier, and wherein the identifying of the one or more second communications uses second metadata retrieved from the second node using a second identifier.

15. The analytic engine of claim 14, wherein each of the first and second metadata includes information logged by an enforcement point.

16. The analytic engine of claim 14, wherein each of the first and second metadata comprises at least one of a source (IP) address and/or hostname, source port, destination (IP) address and/or hostname, destination port, protocol, application, username and/or other credentials used to gain access to computing resources on a network, and number of bytes in a communication.

17. The analytic engine of claim 10, wherein each of the first and second risk scores and the first predetermined threshold is a number within a predetermined range of numbers.

18. A computer-implemented method for recursive multi-layer examination for computer network security remediation comprising:
- retrieving first metadata using a first identifier associated with a first node, the first metadata comprising at least one of a source (IP) address and/or hostname, source port, destination (IP) address and/or hostname, destination port, protocol, application, username and/or other credentials used to gain access to computing resources on a network, and number of bytes in a communication;
- identifying one or more first communications originating from or directed to the first node using the first metadata;
- ascertaining a first characteristic of each of the one or more first communications using the first metadata;
- selecting a respective first scanlet of a plurality of scanlets, the respective first scanlet using the first characteristic of a respective first communication of the one or more first communications;
- applying the respective first scanlet to the respective first communication;
- receiving a first risk score for each of the one or more first communications responsive to the applying of the respective first scanlet;
- determining the first risk score associated with one of the one or more first communications exceeds a first predetermined threshold;
- indicating the first node and a second node in communication with the first node via the one of the one or more first communications are malicious;
- retrieving second metadata using a second identifier associated with the second node, the second metadata comprising at least one of a source (IP) address and/or hostname, source port, destination (IP) address and/or hostname, destination port, protocol, application, username and/or other credentials used to gain access to computing resources on a network, and number of bytes in a communication;
- identifying one or more second communications originating from or directed to the second node using the second metadata;
- ascertaining a second characteristic of each of the one or more second communications using the second metadata;
- selecting a respective second scanlet of the plurality of scanlets, the respective second scanlet using the second characteristic of a respective second communication of the one or more second communications;
- applying the respective second scanlet to the respective second communication;
- receiving a second risk score for each of the one or more second communications responsive to the applying of the respective second scanlet;
- determining the second risk score associated with one of the one or more second communications exceeds the first predetermined threshold;
- indicating a third node in communication with the second node via the one of the one or more second communications is malicious;
- providing the indicated malicious nodes and communications originating from or directed to the indicated malicious nodes, such that progress of a security breach or intrusion through the indicated malicious nodes and communications is indicated;
- remediating the security breach;
- assigning a node risk score to an additional second node in which additional second risk scores, for additional second communications originating from or directed to the additional second node, do not exceed the first predetermined threshold, the node risk score being an average of the additional second risk scores; and
- determining the node risk score exceeds a second predetermined threshold and indicating the additional second node is malicious.

\* \* \* \* \*